(12) United States Patent
Sainani et al.

(10) Patent No.: US 10,160,816 B2
(45) Date of Patent: Dec. 25, 2018

(54) PROCATALYST FOR POLYMERIZATION OF OLEFINS

(71) Applicants: SABIC GLOBAL TECHNOLOGIES B.V., Bergen op Zoom (NL); Jaiprakash Brijlal Sainani, Manjusar (IN); Abhyankan Shirish, Bangalore (IN); Gennadii Dimitrievich Bukatov, Geleen (NL); Martin Alexander Zuideveld, Geleen (NL); Mansour Taftaf, Geleen (NL); Aurora Alexandra Batinas-Geurts, Geleen (NL)

(72) Inventors: Jaiprakash Brijlal Sainani, Baroda (IN); Shirish Shrikant Abhyankar, Bangalore (IN); Gennadii Dimitrievich Bukatov, Geleen (NL); Martin Alexander Zuideveld, Geleen (NL); Mansour Taftaf, Geleen (NL); Aurora Alexandra Batinas-Geurts, Sittard (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/314,966

(22) PCT Filed: Jun. 1, 2015

(86) PCT No.: PCT/EP2015/062131
§ 371 (c)(1),
(2) Date: Nov. 30, 2016

(87) PCT Pub. No.: WO2015/185495
PCT Pub. Date: Dec. 10, 2015

(65) Prior Publication Data
US 2017/0198072 A1 Jul. 13, 2017

Related U.S. Application Data

(60) Provisional application No. 62/057,262, filed on Sep. 30, 2014.

(30) Foreign Application Priority Data

Jun. 2, 2014 (EP) .................................... 14170834
Mar. 27, 2015 (EP) .................................... 15161412

(51) Int. Cl.
*C08F 110/06* (2006.01)

(52) U.S. Cl.
CPC ................................ *C08F 110/06* (2013.01)

(58) Field of Classification Search
None
See application file for complete search history.

(56) References Cited

U.S. PATENT DOCUMENTS

| | | | |
|---|---|---|---|
| 4,399,054 A | 8/1983 | Ferraris et al. |
| 4,414,132 A | 11/1983 | Goodall et al. |
| 4,472,524 A | 9/1984 | Albizzati |
| 4,978,648 A | 12/1990 | Barbe et al. |

(Continued)

FOREIGN PATENT DOCUMENTS

| | | |
|---|---|---|
| EP | 0019330 A | 11/1980 |
| EP | 0398698 A2 | 11/1990 |

(Continued)

OTHER PUBLICATIONS

S. van der Ven, Polypropylene and other Polyolefins, Elsevier 1990, p. 8-10.
"Perodic System of the Elements," Handbook of Chemistry and Physics, CRC Press; 1989-1990, 70th Edition.
International Search Report for International Application No. PCT/EP2015/062131; International Filing Date: Jun. 1, 2015; dated Jul. 22, 2015; 6 Pages.
N. Pasquini (ed.) "Polypropylene handbook" 2nd edition, Carl Hanser Verlag Munich, 2005. Chapter 6.2, 11 Pages.
Pullukat, T. et al. "Silica-Based Ziegler-Natta Catalysts: A Patent Review", Catalysis Reviews: Science and Engineering, 1999, vol. 41, Issues 3-4, pp. 389-428.

(Continued)

*Primary Examiner* — Catherine S Branch
(74) *Attorney, Agent, or Firm* — Cantor Colburn LLP

(57) ABSTRACT

The present invention relates to a procatalyst comprising the compound represented by Formula (A), preferably the Fischer projection of formula (A) as an internal electron donor. The invention also relates to a process for preparing said procatalyst. Furthermore, the invention is directed to a catalyst system for polymerization of olefins comprising the said procatalyst, a co-catalyst and optionally an external electron donor; a process of making polyolefins by contacting at least one olefin with said catalyst system and to polyolefins obtainable by said process. The invention also relates to the use of said procatalyst in the polymerization of olefins. Moreover, the present invention relates to polymers obtained by polymerization using said procatalyst and to the shaped articles of said polymers.

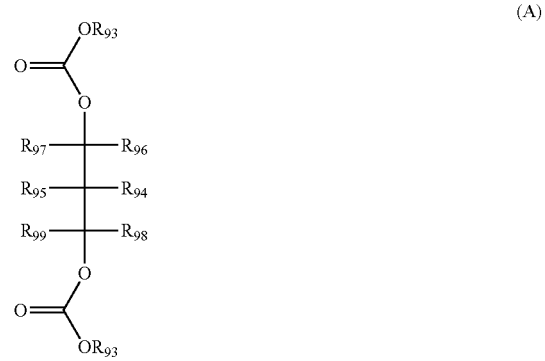

(A)

23 Claims, No Drawings

(56) References Cited

U.S. PATENT DOCUMENTS

| | | |
|---|---|---|
| 5,077,357 A | 12/1991 | Job |
| 5,106,806 A | 4/1992 | Job |
| 5,556,820 A | 9/1996 | Funabashi et al. |
| 6,395,670 B1 | 5/2002 | Morini et al. |
| 2009/0306315 A1* | 12/2009 | Ramjoie ................. C08F 10/00 526/124.3 |
| 2011/0130529 A1 | 6/2011 | Coalter, III et al. |
| 2011/0130530 A1 | 6/2011 | Coalter, III et al. |

FOREIGN PATENT DOCUMENTS

| | | |
|---|---|---|
| EP | 1273595 A1 | 1/2003 |
| EP | 1283222 A1 | 2/2003 |
| EP | 1538167 A1 | 6/2005 |
| EP | 1783145 A1 | 5/2007 |
| EP | 2636687 A1 | 9/2013 |
| WO | 9632426 A1 | 10/1996 |
| WO | 9632427 A1 | 10/1996 |
| WO | 0123441 A1 | 4/2001 |
| WO | 2006010414 A1 | 2/2006 |
| WO | 2006056338 A1 | 6/2006 |
| WO | 2007134851 A1 | 11/2007 |
| WO | 2014001257 A1 | 1/2014 |

OTHER PUBLICATIONS

Written Opinion of the International Searching Authority for International Application No. PCT/EP2015/062131; International Filing Date: Jun. 1, 2015; dated Jul. 22, 2015; 7 Pages.

* cited by examiner

PROCATALYST FOR POLYMERIZATION OF OLEFINS

CROSS REFERENCE TO RELATED APPLICATIONS

This application is a 371 of International Application No. PCT/EP2015/062131, filed Jun. 1, 2015, which claims priority to European Application No. 15161412.0, filed Mar. 27, 2015, Provisional Application No. 62/057,262, filed Sep. 30, 2014, and European Application No. 14170834.7, filed Jun. 2, 2014, all of which are incorporated by reference in their entirety herein.

The invention relates to a procatalyst for polymerization of olefins. The invention also relates to a process for preparing said procatalyst and to the procatalyst obtained via said process. Furthermore, the invention is directed to a catalyst system for polymerization of olefins comprising the said procatalyst, a co-catalyst and optionally an external electron donor; a process of making polyolefins by contacting at least one olefin with said catalyst system and to polyolefins obtainable by said process. The invention also relates to the use of said procatalyst in the polymerization of olefins. Moreover, the present invention relates to polymers obtained by polymerization using said procatalyst and to the shaped articles of said polymers and to the use of said polymers.

Catalyst systems and their components that are suitable for preparing a polyolefin are generally known. One type of such catalysts is generally referred to as Ziegler-Natta catalysts. The term "Ziegler-Natta" is known in the art and it typically refers to catalyst systems comprising a transition metal-containing solid catalyst compound (also typically referred to as a procatalyst); an organometallic compound (also typically referred to as a co-catalyst) and optionally one or more electron donor compounds (e.g. external electron donors).

The transition metal-containing solid catalyst compound comprises a transition metal halide (e.g. titanium halide, chromium halide, hafnium halide, zirconium halide, vanadium halide) supported on a metal or metalloid compound (e.g. a magnesium compound or a silica compound). An overview of such catalyst types is for example given by T. Pullukat and R. Hoff in Catal. Rev.—Sci. Eng. 41, vol. 3 and 4, 389-438, 1999. The preparation of such a procatalyst is for example disclosed in WO96/32427 A1.

There is, an on-going need in industry for phthalate free catalyst for preparing polymers.

It is an object of the invention to provide a phthalate free procatalyst for polymerization of olefins. It is a further object of the present invention is to provide a procatalyst which shows good performance, especially an improved hydrogen sensitivity.

At least one of the aforementioned objects of the present invention is achieved with a first aspect of the present invention, being a procatalyst for polymerization of olefins, which comprises the compound represented by formula (A), preferably by the Fischer projection of formula (A), as an internal electron donor,

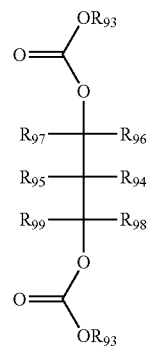

Formula A

Each $R^{93}$ group is independently a linear, branched or cyclic hydrocarbyl group selected from alkyl, alkenyl, aryl, aralkyl, or alkylaryl groups, and one or more combinations thereof, preferably having from 1 to 30 carbon atoms; preferably wherein each of $R^{93}$ is independently selected from the group consisting of aryl having 6 to 20 carbon atoms, preferably 6 to 12 carbon atoms. In an embodiment, $R^{93}$ is preferably ethyl or phenyl, even more preferably ethyl.

$R^{94}$, $R^{95}$, $R^{96}$, $R^{97}$, $R^{98}$, and $R^{99}$ are each independently selected from hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms.

Formula A is a so-called carbonate-carbonate compound or dicarbonate or biscarbonate compound.

In an embodiment of said first aspect, $R^{94}$, $R^{95}$, $R^{96}$, $R^{97}$, $R^{98}$, and $R^{99}$ are independently selected from a group consisting of hydrogen, $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group.

In a further embodiment of said first aspect, $R^{94}$ and $R^{95}$ are each a hydrogen atom and $R^{96}$, $R^{97}$, $R^{98}$, and $R^{99}$ are independently selected from a group consisting of $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group, preferably from $C_1$-$C_{10}$ straight and branched alkyl and more preferably from methyl, ethyl, propyl, isopropyl, butyl, tert-butyl, phenyl group.

In a further embodiment of said first aspect, when one of $R^{96}$ and $R^{97}$ and one of $R^{98}$ and $R^{99}$ has at least one carbon atom, then the other one of $R^{96}$ and $R^{97}$ and of $R^{98}$ and $R^{99}$ is each a hydrogen atom.

In embodiment, $R^{94}$, $R^{95}$, $R^{97}$, and $R^{99}$ are hydrogen and $R^{96}$, and $R^{98}$ are methyl. In embodiment, $R^{94}$, $R^{95}$, $R^{97}$, and $R^{99}$ are hydrogen and $R^{96}$, and $R^{98}$ are methyl, and both $R^{93}$ are phenyl. In embodiment, $R^{94}$, $R^{95}$, $R^{97}$, and $R^{99}$ are hydrogen and $R^{96}$, and $R^{98}$ are methyl, and both $R^{93}$ are ethyl.

In a further embodiment of said first aspect, $R^{93}$ is a aliphatic hydrocarbyl group or an aromatic hydrocarbyl group. $R^{93}$ may be substituted on unsubstituted.

In case $R^{93}$ is an aromatic hydrocarbyl group, it may be phenyl or substituted phenyl or any other aromatic group having from 6 to 20 carbon atoms.

In a preferred embodiment, the procatalyst comprises the compound represented by formula A as an internal electron donor and ethyl acetate as activator.

In a preferred embodiment, the procatalyst comprises the compound represented by the Fischer projection of formula A as an internal electron donor and ethyl acetate as activator.

In a preferred embodiment, the procatalyst comprises the compound represented by formula A as an internal electron donor and ethyl benzoate as activator.

In a preferred embodiment, the procatalyst comprises the compound represented by the Fischer projection of formula A as an internal electron donor and ethyl benzoate as activator.

In a preferred embodiment, the procatalyst comprises the compound represented by formula A as an internal electron donor and the procatalyst is prepared using butyl Grignard, preferably n-BuMgCl, as the Grignard compound in step i) (see below).

In a preferred embodiment, the procatalyst comprises the compound represented by the Fischer projection of formula A as an internal electron donor and the procatalyst is prepared using butyl Grignard, preferably n-BuMgCl, as the Grignard compound in step i) (see below).

In a preferred embodiment, the procatalyst comprises the compound represented by formula A as an internal electron donor and the procatalyst is prepared using phenyl Grignard, preferably PhMgCl, as the Grignard compound in step i).

In a preferred embodiment, the procatalyst comprises the compound represented by the Fischer projection of formula A as an internal electron donor and the procatalyst is prepared using phenyl Grignard, preferably PhMgCl, as the Grignard compound in step i).

In a preferred embodiment, the procatalyst comprises the compound represented by formula A as an internal electron donor and ethyl acetate as activator that may be used in step iii) (see below) and the procatalyst is prepared using butyl Grignard, preferably n-BuMgCl, as the Grignard compound in step i).

In a preferred embodiment, the procatalyst comprises the compound represented by the Fischer projection of formula A as an internal electron donor and ethyl acetate as activator that may be used in step iii) (see below) and the procatalyst is prepared using butyl Grignard, preferably n-BuMgCl, as the Grignard compound in step i).

In a preferred embodiment, the procatalyst comprises the compound represented by formula A as an internal electron donor and ethyl acetate as activator that may be used in step iii) and the procatalyst is prepared using phenyl Grignard, preferably PhMgCl, as the Grignard compound in step i).

In a preferred embodiment, the procatalyst comprises the compound represented by the Fischer projection of formula A as an internal electron donor and ethyl acetate as activator that may be used in step iii) and the procatalyst is prepared using phenyl Grignard, preferably PhMgCl, as the Grignard compound in step i).

In a preferred embodiment, the procatalyst comprises the compound represented by formula A as an internal electron donor and ethyl benzoate as activator that may be used in step iii) and the procatalyst is prepared using butyl Grignard, preferably n-BuMgCl, as the Grignard compound in step i).

In a preferred embodiment, the procatalyst comprises the compound represented by the Fischer projection of formula A as an internal electron donor and ethyl benzoate as activator that may be used in step iii) and the procatalyst is prepared using butyl Grignard, preferably n-BuMgCl, as the Grignard compound in step i).

In a preferred embodiment, the procatalyst comprises the compound represented by formula A as an internal electron donor and ethyl benzoate as activator that may be used in step iii) and the procatalyst is prepared using phenyl Grignard, preferably PhMgCl, as the Grignard compound in step i).

In a preferred embodiment, the procatalyst comprises the compound represented by the Fischer projection of formula A as an internal electron donor and ethyl benzoate as activator that may be used in step iii) and the procatalyst is prepared using phenyl Grignard, preferably PhMgCl, as the Grignard compound in step i).

In a preferred embodiment, the procatalyst has been modified by using a group 13- or transition metal modifier and moreover comprises the compound represented by formula A as an internal electron donor and ethyl acetate as activator.

In a preferred embodiment, the procatalyst has been modified by using a group 13- or transition metal modifier and moreover comprises the compound represented by the Fischer projection of formula A as an internal electron donor and ethyl acetate as activator.

In a preferred embodiment, the procatalyst has been modified by using a group 13- or transition metal modifier and moreover comprises the compound represented by formula A as an internal electron donor and ethyl benzoate as activator.

In a preferred embodiment, the procatalyst has been modified by using a group 13- or transition metal modifier and moreover comprises the compound represented by the Fischer projection of formula A as an internal electron donor and ethyl benzoate as activator.

In a preferred embodiment, the procatalyst has been modified by using a group 13- or transition metal modifier and moreover comprises the compound represented by formula A as an internal electron donor and the procatalyst is prepared using butyl Grignard, preferably n-BuMgCl, as the Grignard compound in step i).

In a preferred embodiment, the procatalyst has been modified by using a group 13- or transition metal modifier and moreover comprises the compound represented by the Fischer projection of formula A as an internal electron donor and the procatalyst is prepared using butyl Grignard, preferably n-BuMgCl, as the Grignard compound in step i).

In a preferred embodiment, the procatalyst has been modified by using a group 13- or transition metal modifier and moreover comprises the compound represented by formula A as an internal electron donor and the procatalyst is prepared using phenyl Grignard, preferably PhMgCl, as the Grignard compound in step i).

In a preferred embodiment, the procatalyst has been modified by using a group 13- or transition metal modifier and moreover comprises the compound represented by the Fischer projection of formula A as an internal electron donor and the procatalyst is prepared using phenyl Grignard, preferably PhMgCl, as the Grignard compound in step i).

In a preferred embodiment, the procatalyst has been modified by using a group 13- or transition metal modifier and moreover comprises the compound represented by formula A as an internal electron donor and ethyl acetate as activator that may be used in step iii) and the procatalyst is prepared using butyl Grignard, preferably n-BuMgCl, as the Grignard compound in step i).

In a preferred embodiment, the procatalyst has been modified by using a group 13- or transition metal modifier and moreover comprises the compound represented by the Fischer projection of formula A as an internal electron donor and ethyl acetate as activator that may be used in step iii) and the procatalyst is prepared using butyl Grignard, preferably n-BuMgCl, as the Grignard compound in step i).

In a preferred embodiment, the procatalyst has been modified by using a group 13- or transition metal modifier and moreover comprises the compound represented by formula A as an internal electron donor and ethyl acetate as activator that may be used in step iii) and the procatalyst is prepared using phenyl Grignard, preferably PhMgCl, as the Grignard compound in step i).

In a preferred embodiment, the procatalyst has been modified by using a group 13- or transition metal modifier and moreover comprises the compound represented by the Fischer projection of formula A as an internal electron donor and ethyl acetate as activator that may be used in step iii) and the procatalyst is prepared using phenyl Grignard, preferably PhMgCl, as the Grignard compound in step i).

In a preferred embodiment, the procatalyst has been modified by using a group 13- or transition metal modifier and moreover comprises the compound represented by formula A as an internal electron donor and ethyl benzoate as activator that may be used in step iii) and the procatalyst is prepared using butyl Grignard, preferably n-BuMgCl, as the Grignard compound in step i).

In a preferred embodiment, the procatalyst has been modified by using a group 13- or transition metal modifier and moreover comprises the compound represented by the Fischer projection of formula A as an internal electron donor and ethyl benzoate as activator that may be used in step iii) and the procatalyst is prepared using butyl Grignard, preferably n-BuMgCl, as the Grignard compound in step i).

In a preferred embodiment, the procatalyst has been modified by using a group 13- or transition metal modifier and moreover comprises the compound represented by formula A as an internal electron donor and ethyl benzoate as activator that may be used in step iii) and the procatalyst is prepared using phenyl Grignard, preferably PhMgCl, as the Grignard compound in step i).

In a preferred embodiment, the procatalyst has been modified by using a group 13- or transition metal modifier and moreover comprises the compound represented by the Fischer projection of formula A as an internal electron donor and ethyl benzoate as activator that may be used in step iii) and the procatalyst is prepared using phenyl Grignard, preferably PhMgCl, as the Grignard compound in step i).

In a second aspect, the present invention relates to a process for preparing the procatalyst according to the present invention, comprising contacting a magnesium-containing support with a halogen-containing titanium compound and an internal electron donor, wherein the internal electron donor is represented by the compound of Formula A, preferably the Fischer projection of Formula A, Formula A

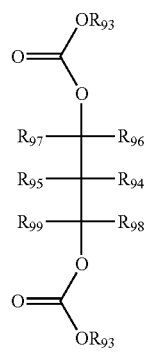

Wherein each $R^{93}$ group is independently linear, branched or cyclic hydrocarbyl a group selected from alkyl, alkenyl, aryl, aralkyl, or alkylaryl groups, and one or more combinations thereof, preferably having from 1 to 30 carbon atoms. In an embodiment, each of $R^{93}$ is independently selected from the group consisting of aryl having 6 to 20 carbon atoms, preferably 6 to 12 carbon atoms, more preferably phenyl.

$R^{94}$, $R^{95}$, $R^{96}$, $R^{97}$, $R^{98}$, and $R^{99}$ are each independently selected from hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms.

In an embodiment of said second aspect, said method comprises the steps of:

i) contacting a compound $R^4_z MgX^4_{2-z}$ with an alkoxy— or aryloxy-containing silane compound to give a first intermediate reaction product, being a solid $Mg(OR^1)xX^1_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; $X^4$ and $X^1$ are each independently selected from the group of consisting of fluoride (F—), chloride (Cl—), bromide (Br—) or iodide (I—), preferably chloride; z is in a range of larger than 0 and smaller than 2, being 0<z<2;

ii) optionally contacting the solid $Mg(OR^1)_x X^1_{2-x}$ obtained in step ii) with at least one activating compound selected from the group formed by activating electron donors and metal alkoxide compounds of formula $M^1(OR^2)_{v-w}(OR^3)_w$, or $M^2(OR^2)_{v-w}(R^3)_w$, to obtain a second intermediate product; wherein: $M^1$ is a metal selected from the group consisting of Ti, Zr, Hf, Al or Si; v is the valency of $M^1$; $M^2$ is a metal being Si; v is the valency of $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms; v being either 3 or 4; and w is smaller than v; and iii) contacting the first or second intermediate reaction product, obtained respectively in step i) or ii), with a halogen-containing Ti—compound and said internal electron represented by a compound of Formula A, preferably the Fischer projection of Formula A.

In other words, this embodiment relates to a process comprising the steps of i) contacting a compound $R^4_z MgX^4_{2-z}$ wherein $R^4$ is aromatic, aliphatic or cycloaliphatic group containing 1 to 20 carbon atoms, X is a halide, and z is in a range of larger than 0 and smaller than 2, with an alkoxy- or aryloxy-containing silane compound to give a first intermediate reaction product; ii) contacting the solid $Mg(OR^1)_x X_{2-x}$ with at least one activating compound selected from the group formed by electron donors and compounds of formula $M^1(OR^2)_{v-w}(OR^3)_w$, wherein $M^1$ is Ti, Zr, Hf or Al and $M^2(OR^2)_{v-w}(R^3)_w$, wherein $M^2$ is Si, each $R^2$ and $R^3$, independently, represent an alkyl, alkenyl or aryl group, v is the valency of M, v being either 3 or 4 and w is smaller than v; and iii) contacting the second intermediate reaction product with a halogen-containing Ti-compound, an internal electron donor represented by the Fischer projection of formula A, In a further embodiment of said second aspect, during step ii) as activating compounds an alcohol is used as activating electron donor and titanium tetraalkoxide is used as metal alkoxide compound.

In a further embodiment, an activator is used, preferably in step iii).

In a further embodiment, said activator is selected from the group consisting of benzamides, alkylbenzoates, and mono-esters.

In a further embodiment, said activator is selected from the group consisting of ethyl acetate, amyl acetate, butyl acetate, ethyl acrylate, methyl methacrylate, and isobutyl methacrylate, benzamide, methylbenzamide, dimethylbenzamide, methylbenzoate, ethylbenzoate, n-propylbenzoate, iso-propylbenzoate, n-butylbenzoate, 2-butylbenzoate, and t-butylbenzoate.

In a preferred embodiment, ethyl acetate is used as activator.

In another aspect a butyl Grignard (preferably BuMgCl) is used to prepare the procatalyst composition. Preferably, an activator is added during the preparation of the procatalyst, more preferably ethyl acetate.

In an embodiment of said second aspect, said method comprises the steps of:

i) contacting a BuMgCl compound with tetraethoxysilane to give a first intermediate reaction product, being a solid Mg(OEt)Cl ii) contacting the solid Mg(OEt)Cl obtained in step ii) with an alcohol as activating electron donors and titanium tetraalkoxide as metal alkoxide compound iii) contacting the second intermediate reaction product, obtained in step ii), with a halogen-containing Ti-compound and said internal electron represented by a compound of Formula A, preferably the Fischer projection of Formula A.

In another aspect, the present invention relates to a procatalyst for polymerization of olefins, which comprises the compound represented by the Fischer projection of formula A as an internal electron donor, wherein: $R^{94}$, $R^{95}$, $R^{96}$, $R^{97}$, $R^{98}$, and $R^{99}$ are the same or different and are independently selected from a group consisting of hydrogen straight, branched and cyclic alkyl and aromatic substituted and unsubstituted hydrocarbyl having 1 to 20 carbon atoms; each of $R^{93}$ is independently selected from the group consisting of aryl having 6 to 20 carbon atoms. In an embodiment of said aspect, at least one $R^{93}$ is phenyl, preferably both $R^{93}$ are phenyl. All other embodiments discussed for the other aspects of the invention are also applicable to this aspect.

In a specific aspect, the present invention relates to a process for preparing a procatalyst for polymerization of olefins, comprising contacting a magnesium-containing support with a halogen-containing titanium compound and an internal electron donor, wherein the internal electron donor is represented by a compound of Formula A, preferably the Fischer projection of formula A; wherein: $R^{94}$, $R^{95}$, $R^{96}$, $R^{97}$, $R^{98}$, and $R^{99}$ are the same or different and are independently selected from a group consisting of hydrogen straight, branched and cyclic alkyl and aromatic substituted and unsubstituted hydrocarbyl having 1 to 20 carbon atoms; each $R^{93}$ group is independently a linear, branched or cyclic hydrocarbyl aliphatic or aromatic group selected from alkyl, alkenyl, aryl, aralkyl, alkoxycarbonyl or alkylaryl groups, and one or more combinations thereof, preferably having from 1 to 30 carbon atoms;

said process comprising the steps of:

i) contacting a compound $R^4zMgX^4_{2-z}$ with an alkoxy-or aryloxy-containing silane compound to give a first intermediate reaction product, being a solid $Mg(OR^1)_xX^1_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; $X^4$ and $X^1$ are each independently selected from the group of consisting of fluoride (F—), chloride (Cl—), bromide (Br—) or iodide (I—), preferably chloride; z is in a range of larger than 0 and smaller than 2, being 0<z<2;

ii) optionally contacting the solid $Mg(OR^1)_xX^1_{2-x}$ obtained in step ii) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate product; wherein: $M^1$ is a metal selected from the group consisting of Ti, Zr, Hf, Al or Si; v is the valency of $M^1$; $M^2$ is a metal being Si; v is the valency of $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms; v being either 3 or 4 and w is smaller than v; and iii) contacting the first or second intermediate reaction product, obtained respectively in step i) or ii), with a halogen-containing Ti-compound and said internal electron represented by a compound of Formula A, preferably the Fischer projection of Formula A.

All other embodiments discussed for the other aspects of the invention are also applicable to this aspect.

In another aspect, the present invention relates to a polymerization catalyst system comprising the procatalyst according to the present invention, a co-catalyst and optionally an external electron donor.

In another aspect, the present invention relates to a process of making a polyolefin, preferably a polypropylene, by contacting at least one olefin with the catalyst system according to the present invention.

In an embodiment of this aspect, propylene is used as said olefin to obtain polypropylene.

In another aspect, the present invention relates to polyolefin, preferably a polypropylene obtainable by the process of making a polyolefin according to the present invention.

In another aspect, the present invention relates to shaped article, comprising the polyolefin, preferably the polypropylene according to the above aspect of the present invention.

In another aspect, the present invention relates to the use of the compound represented by Formula A, preferably the Fischer projection of Formula A, as an internal electron donor in a procatalyst for the polymerization of at least one olefin,

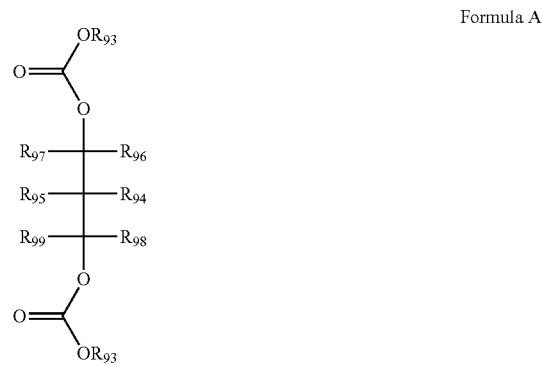

Formula A wherein: each $R^{93}$ group is independently a linear, branched or cyclic hydrocarbyl group preferably having from 1 to 30 carbon atoms. In an embodiment, each of $R^{93}$ is independently selected from the group consisting of aryl having 6 to 20 carbon atoms, preferably 6 to 12 carbon atoms, more preferably phenyl.

$R^{94}$, $R^{95}$, $R^{96}$, $R^{97}$, $R^{98}$, and $R^{99}$ are each independently selected from hydrogen or a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms.

In another aspect, the present invention relates to a compound according to Formula A:

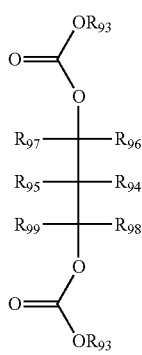

Formula A wherein each $R^{93}$ group is independently a linear, branched or cyclic hydrocarbyl group preferably having from 1 to 30 carbon atoms. Preferably, each of $R^{93}$ is independently selected from the group consisting of aryl having 6 to 20 carbon atoms, preferably 6 to 12 carbon atoms, more preferably phenyl. In another preferred embodiment, $R^{93}$ is preferably an alkyl, most preferably ethyl.

$R^{94}$, $R^{95}$, $R^{96}$, $R^{97}$, $R^{98}$, and $R^{99}$ are each independently selected from hydrogen or a linear, branched or cyclic hydrocarbyl group, selected from alkyl, alkenyl, aryl, aralkyl or alkylaryl groups, and one or more combinations thereof, preferably having from 1 to 20 carbon atoms.

In an embodiment of this aspect, the compound according to formula A is pentane-2,4-diyl diphenyl dicarbonate:

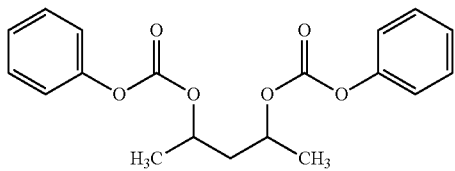 [SMILES: CC(CC(C)OC(=O)Oc1ccccc1)OC(=O)Oc1ccccc1]

In an embodiment of this aspect, the compound according to formula A is diethyl pentane-2,4-diyl dicarbonate:

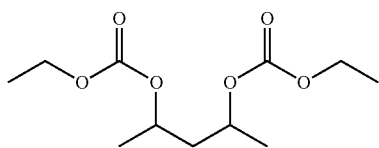 [SMILES: CCOC(=O)OC(C)CC(C)OC(=O)OCC]

These aspects and embodiments will be described in more detail below.

The following definitions are used in the present description and claims to define the stated subject matter. Other terms not cited below are meant to have the generally accepted meaning in the field.

For the all aspects of the present invention, the following is observed:

"Ziegler-Natta catalyst" as used in the present description means: a transition metal-containing solid catalyst compound comprises a transition metal halide selected from titanium halide, chromium halide, hafnium halide, zirconium halide, and vanadium halide, supported on a metal or metalloid compound (e.g. a magnesium compound or a silica compound).

"Ziegler-Natta catalytic species" or "catalytic species" as used in the present description means: a transition metal-containing species comprises a transition metal halide selected from titanium halide, chromium halide, hafnium halide, zirconium halide and vanadium halide, "internal donor" or "internal electron donor" or "ID" as used in the present description means: an electron-donating compound containing one or more atoms of oxygen (O) and/or nitrogen (N). This ID is used as a reactant in the preparation of a solid procatalyst. An internal donor is commonly described in prior art for the preparation of a solid-supported Ziegler-Natta catalyst system for olefins polymerization; i.e. by contacting a magnesium-containing support with a halogen-containing Ti compound and an internal donor.

"external donor" or "external electron donor" or "ED" as used in the present description means: an electron-donating compound used as a reactant in the polymerisation of olefins. An ED is a compound added independent of the procatalyst. It is not added during procatalyst formation. It contains at least one functional group that is capable of donating at least one pair of electrons to a metal atom. The ED may influence catalyst properties, non-limiting examples thereof are affecting the stereoselectivity of the catalyst system in polymerization of olefins having 3 or more carbon atoms, hydrogen sensitivity, ethylene sensitivity, randomness of co-monomer incorporation and catalyst productivity.

"activator" as used in the present description means: an electron-donating compound containing one or more atoms of oxygen (O) and/or nitrogen (N) which is used to during the synthesis of the procatalyst prior to or simultaneous with the addition of an internal donor.

"activating compound" as used in the present description means: a compound used to activate the solid support prior to contacting it with the catalytic species.

"modifier" or "Group 13- or transition metal modifier" as used in the present description means: a metal modifier comprising a metal selected from the metals of Group 13 of the IUPAC Periodic Table of elements and transition metals. Where in the description the terms metal modifier or metal-based modifier is used, Group 13- or transition metal modifier is meant.

"procatalyst" and "catalyst component" as used in the present description have the same meaning: a component of a catalyst composition generally comprising a solid support, a transition metal-containing catalytic species and optionally one or more internal donor.

"halide" or "halogen" as used in the present description means: an ion selected from the group of: fluoride (F—), chloride (Cl—), bromide (Br—) or iodide (I—).

"Heteroatom" as used in the present description means: an atom other than carbon or hydrogen, preferably F, Cl, Br, I, N, O, P, B, S or Si.

"heteroatom selected from group 13, 14, 15, 16 or 17 of the IUPAC Periodic Table of the Elements" as used in the present description means: a hetero atom selected from B, Al, Ga, In, Tl [Group 13], Si, Ge, Sn, Pb [Group 14], N, P, As, Sb, Bi [Group 15], S, Se, Te, Po [Group 16], F, Cl, Br, I, At [Group 17]. More preferably," heteroatom selected from group 13, 14, 15, 16 or 17 of the IUPAC Periodic Table of the Elements" includes N, O, P, B, S, or Si.

"hydrocarbyl" as used in the present description means: is a substituent containing hydrogen and carbon atoms, or linear, branched or cyclic saturated or unsaturated aliphatic radical, such as alkyl, alkenyl, alkadienyl and alkynyl; alicyclic radical, such as cycloalkyl, cycloalkadienyl cycloalkenyl; aromatic radical, such as monocyclic or polycyclic aromatic radical, as well as combinations thereof, such as alkaryl and aralkyl.

"substituted hydrocarbyl" as used in the present description means: is a hydrocarbyl group that is substituted with one or more non-hydrocarbyl substituent groups. A non-limiting example of a non-hydrocarbyl substituent is a heteroatom. Examples are alkoxycarbonyl (viz. carboxylate) groups. When in the present description "hydrocarbyl" is used it can also be "substituted hydrocarbyl", unless stated otherwise.

"alkyl" as used in the present description means: an alkyl group being a functional group or side-chain consisting of carbon and hydrogen atoms having only single bonds. An alkyl group may be straight or branched and may be un-substituted or substituted.

"aryl" as used in the present description means: an aryl group being a functional group or side-chain derived from an aromatic ring. An aryl group and may be un-substituted or substituted with straight or branched hydrocarbyl groups. An aryl group also encloses alkaryl groups wherein one or more hydrogen atoms on the aromatic ring have been replaced by alkyl groups.

"aralkyl" as used in the present description means: an arylalkyl group being an alkyl group wherein one or more hydrogen atoms have been replaced by aryl groups "alkoxide" or "alkoxy" as used in the present description means: a functional group or side-chain obtained from a alkyl alcohol. It consist of an alkyl bonded to a negatively charged oxygen atom.

"aryloxide" or "aryloxy" or "phenoxide" as used in the present description means: a functional group or side-chain obtained from an aryl alcohol. It consist of an aryl bonded to a negatively charged oxygen atom.

"Grignard reagent" or "Grignard compound" as used in the present description means: a compound or a mixture of compounds of formula $R^4{}_z MgX^4{}_{2-z}$ ($R^4$, z, and $X^4$ are as defined below) or it may be a complex having more Mg clusters, e.g. $R_4Mg_3Cl_2$.

"polymer" as used in the present description means: a chemical compound comprising repeating structural units, wherein the structural units are monomers.

"olefin" as used in the present description means: an alkene.

"olefin-based polymer" or "polyolefin" as used in the present description means: a polymer of one or more alkenes.

"propylene-based polymer" as used in the present description means: a polymer of propylene and optionally a comonomer. "polypropylene" as used in the present description means: a polymer of propylene.

"copolymer" as used in the present description means: a polymer prepared from two or more different monomers.

"monomer" as used in the present description means: a chemical compound that can undergo polymerization.

"thermoplastic" as used in the present description means: capable of softening or fusing when heated and of hardening again when cooled.

"Polymer composition" as used in the present description means: a mixture of either two or more polymers or of one or more polymers and one or more additives.

"MWD" or "Molecular weight distribution" as used in the present description means: the same as "PDI" or "polydispersity index". It is the ratio of the weight-average molecular weight (Mw) to the number average molecular weight (Mn), viz. Mw/Mn, and is used as a measure of the broadness of molecular weight distribution of a polymer. Mw and Mn are determined by GPC using either: i) a Waters 150° C. gel permeation chromatograph combined with a Viscotek 100 differential viscosimeter; the chromatograms were run at 140° C. using 1,2,4-trichlorobenzene as a solvent; the refractive index detector was used to collect the signal for molecular weights; or ii) Polymer Laboratories PL-GPC220 combined with a Polymer Laboratories PL BV-400 viscomsimeter, and a refractive index detector, and a Polymer Char IR5 infrared detected; the chromatograms were run at 150° C. using 1,2,4-trichlorobenzene as a solvent; the refractive index detector was used to collect the signal for molecular weights. The values for both methods are the same since they both use calibration against standards.

"XS" or "xylene soluble fraction" or "CXS" or "cold soluble xylene fraction" as used in the present description means: the weight percentage (wt. %) of soluble xylene in the isolated polymer, measured according to ASTM D 5492-10.

"polymerization conditions" as used in the present description means: temperature and pressure parameters within a polymerization reactor suitable for promoting polymerization between the procatalyst and an olefin to form the desired polymer. These conditions depend on the type of polymerization used.

"production rate" or "yield" as used in the present description means: the amount of kilograms of polymer produced per gram of procatalyst consumed in the polymerization reactor per hour, unless stated otherwise.

"APP wt. %" or "weight percentage of atactic polypropylene" as used in the present description means: the fraction of polypropylene obtained in a slurry polymerization that is retained in the solvent. APP can be determined by taking 100 ml of the filtrate ("y" in millilitres) obtained during separation from polypropylene powder after slurry polymerization ("x" in grammes). The solvent is dried over a steam bath and then under vacuum at 60° C. That yields APP ("z" in grammes). The total amount of APP ("q" in grammes) is (y/100)*z. The weight percentage of APP is (q/q+x))*100%.

"MFR" or "Melt Flow rate" as used in the present description is measured at a temperature of 230° C. with 2.16 kg load and measured according to ISO 1133:2005.

Unless stated otherwise, when it is stated that any R group is "independently selected from" this means that when several of the same R groups are present in a molecule they may have the same meaning of they may not have the same meaning. For example, for the compound $R_2M$, wherein R is independently selected from ethyl or methyl, both R groups may be ethyl, both R groups may be methyl or one R group may be ethyl and the other R group may be methyl.

The present invention is described below in more detail. All embodiments described with respect to one aspect of the present invention are also applicable to the other aspects of the invention, unless otherwise stated.

It has been surprisingly found out that the procatalyst comprising the compound of formula A as an internal electron donor shows good control of stereochemistry and shows a good hydrogen sensitivity.

Polyolefins having medium molecular weight distribution are herein polyolefins that may have a Mw/Mn between 4.5 and 6.5, for example between 5.5 and 6.0.

The high isotacticity indicates low amount of amorphous atactic polymer in the products obtained, such as for example lower than 3 wt. %, lower than 2 wt. % or even lower than 1 wt. % of the total amount of polymer.

The xylene solubles content of the polyolefins obtained with the procatalyst according to the present invention is moderate to low, for instance lower than 12 wt % or lower than 10 wt %, lower than 8 wt % and or lower than 4 wt %.

The methods used in the present invention to determine the molecular weight distribution, the amount of atactic polymer, the xylene solubles content and melt flow range are described in the experimental part of the present invention.

A further advantage of the present invention is that a reasonably low amount of wax is formed, i.e. low molecular weight polymers during the polymerization reaction, which results in reduced or no "stickiness" on the inside walls of the polymerization reactor and inside the reactor. In addition, the procatalyst according to the present invention can be phthalate-free and thus allows obtaining non-toxic polyolefins showing no harmful effects on human health and which thus can be used for instance in food and medical industry.

Preferably, the procatalyst according to the invention comprises the compound having formula A as the only internal electron donor in a Ziegler-Natta catalyst composition.

Embodiments of the internal donor are disclosed below $R^{94}$, $R^{95}$, $R^{96}$, $R^{97}$, $R^{98}$, and $R^{99}$ are each independently selected from hydrogen or a hydrocarbyl group, selected from alkyl, alkenyl, aryl, aralkyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms.

More preferably, $R^{94}$, $R^{95}$, $R^{96}$, $R^{97}$, $R^{98}$, and $R^{99}$ are independently selected from a group consisting of hydrogen, $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group.

Even more preferably, $R^{94}$, $R^{95}$, $R^{96}$, $R^{97}$, $R^{98}$, and $R^{99}$ are independently selected from a group consisting of hydrogen, methyl, ethyl, propyl, isopropyl, butyl, tert-butyl, phenyl, trifluoromethyl and halophenyl group.

Most preferably, $R^{94}$, $R^{95}$, $R^{96}$, $R^{97}$, $R^{98}$, and $R^{99}$ are each hydrogen, methyl, ethyl, propyl, tert-butyl, phenyl or trifluoromethyl.

Preferably, $R^{94}$ and $R^{95}$ is each a hydrogen atom.

More preferably, $R^{94}$ and $R^{95}$ is each a hydrogen atom and each of $R^{96}$, $R^{97}$, $R^{98}$, and $R^{99}$ is selected from the group consisting of hydrogen, $C_1$-$C_{10}$ straight and branched alkyls; $C_3$-$C_{10}$ cycloalkyls; $C_6$-$C_{10}$ aryls; and $C_7$-$C_{10}$ alkaryl and aralkyl group.

Preferably, at least one of $R^{96}$ and $R^{97}$ and at least one of $R^{98}$ and $R^{99}$ is a hydrocarbyl group.

More preferably, when at least one of $R^{96}$ and $R^{97}$ and one of $R^{98}$ and $R^{99}$ is a hydrocarbyl group having at least one carbon atom then the other one of $R^{96}$ and $R^{97}$ and one of $R^{98}$ and $R^{99}$ is each a hydrogen atom. $R^{97}$ and $R^{99}$ may be selected from the group consisting of $C_1$-$C_{10}$ alkyl, such as methyl, ethyl, propyl, isopropyl, butyl, tert-butyl, phenyl, trifluoromethyl and halophenyl group; and most preferably methyl.

Most preferably, when one of $R^{96}$ and $R^{97}$ and one of $R^{98}$ and $R^{99}$ is a hydrocarbyl group having at least one carbon atom (preferably methyl), then the other one of $R^{96}$ and $R^{97}$ and of $R^{98}$ and $R^{99}$ is each a hydrogen atom and $R^{94}$ and $R^{95}$ is each a hydrogen atom.

The compound according to Formula A can be made by any method known in the art.

The molar ratio of the internal donor of Formula A relative to the magnesium can be from 0.02 to 0.5. Preferably, this molar ratio is from 0.05 to 0.2.

The process for preparing the procatalyst according to the present invention comprises contacting a magnesium-containing support with a halogen-containing titanium compound and an internal donor, wherein the internal electron donor is the compound represented by Formula A, preferably the Fischer projection of the Formula A.

The present invention is related to Ziegler-Natta type catalyst. A Ziegler-Natta type procatalyst generally comprising a solid support, a transition metal-containing catalytic species and an internal donor. The present invention moreover relates to a catalyst system comprising a Ziegler-Natta type procatalyst, a co-catalyst and optionally an external electron donor.

The transition metal-containing solid catalyst compound comprises a transition metal halide (e.g. titanium halide, chromium halide, hafnium halide, zirconium halide, vanadium halide) supported on a metal or metalloid compound (e.g. a magnesium compound or a silica compound).

Specific examples of several types of Ziegler-Natta catalyst as disclosed below.

Preferably, the present invention is related to a so-called TiNo catalyst. It is a magnesium-based supported titanium halide catalyst optionally comprising an internal donor.

The magnesium-containing support and halogen-containing titanium compounds used in the process according to the present invention are known in the art as typical components of a Ziegler-Natta catalyst composition. Any of said Ziegler-Natta catalytic species known in the art can be used in the process according to the present invention. For instance, synthesis of such titanium-magnesium based catalyst compositions with different magnesium-containing support-precursors, such as magnesium halides, magnesium alkyls and magnesium aryls, and also magnesium alkoxy and magnesium aryloxy compounds for polyolefin production, particularly of polypropylenes production are described for instance in U.S. Pat. No. 4,978,648, WO96/32427A1, WO01/23441 A1, EP1283 222A1, EP1222 21461; U.S. Pat. Nos. 5,077,357; 5,556,820; 4,414,132; 5,106,806 and 5,077,357 but the present process is not limited to the disclosure in these documents.

EP 1 273 595 of Borealis Technology discloses a process for producing an olefin polymerisation procatalyst in the form of particles having a predetermined size range, said process comprising: preparing a solution a complex of a group IIa metal and an electron donor by reacting a compound of said metal with said electron donor or a precursor thereof in an organic liquid reaction medium; reacting said complex, in solution, with at least one compound of a transition metal to produce an emulsion the dispersed phase of which contains more than 50 mol % of the group IIa metal in said complex; maintaining the particles of said dispersed phase within the average size range 10 to 200 mu m by agitation in the presence of an emulsion stabilizer and solidifying said particles; and recovering, washing and drying said particles to obtain said procatalyst.

EP 0 019 330 of Dow discloses a Ziegler-Natta type catalyst composition. Said olefin polymerization catalyst composition comprising: a) a reaction product of an organo aluminum compound and an electron donor, and b) a solid component which has been obtained by halogenating a magnesium compound with the formula $MgR^1R^2$ wherein $R^1$ is an alkyl, aryl, alkoxide or aryloxide group and $R^2$ is an alkyl, aryl, alkoxide or aryloxide group or halogen, with a halide of tetravalent titanium in the presence of a halohydrocarbon, and contacting the halogenated product with a tetravalent titanium compound.

The procatalyst may be produced by any method known in the art using the present internal electron donor according for Formula A.

The procatalyst may also be produced as disclosed in WO96/32426A; this document discloses a process for the polymerization of propylene using a catalyst comprising a procatalyst obtained by a process wherein a compound with formula $Mg(OAlk)_xCl_y$ wherein x is larger than 0 and smaller than 2, y equals 2-x and each Alk, independently, represents an alkyl group, is contacted with a titanium tetraalkoxide and/or an alcohol in the presence of an inert dispersant to give an intermediate reaction product and wherein the intermediate reaction product is contacted with titanium tetrachloride in the presence of an internal donor, which is di-n-butyl phthalate.

Preferably, the Ziegler-Natta type procatalyst in the catalyst system according to the present invention is obtained by the process as described in WO 2007/134851 A1. In Example I the process is disclosed in more detail. Example I including all sub-examples (IA-IE) is incorporated into the present description. More details about the different embodiments are disclosed starting on page 3, line 29 to page 14 line 29. These embodiments are incorporated by reference into the present description.

In the following part of the description the different steps and phases of the process for preparing the procatalyst according to the present invention will be discussed.

The process for preparing a procatalyst according to the present invention comprises the following phases:

Phase A): preparing a solid support for the procatalyst;
Phase B): optionally activating said solid support obtained in phase A) using one or more activating compounds to obtain an activated solid support;
Phase C): contacting said solid support obtained in phase A) or said activated solid support in phase B) with a catalytic species wherein phase C) comprises one of the following:
  contacting said solid support obtained in phase A) or said activated solid support in phase B) with a catalytic species and one or more internal donors to obtain said procatalyst; or
  contacting said solid support obtained in phase A) or said activated solid support in phase B) with a catalytic species and one or more internal donors to obtain an intermediate product; or
  contacting said solid support obtained in phase A) or said activated solid support in phase B) with a catalytic species and an activator to obtain an intermediate product;
optionally Phase D: modifying said intermediate product obtained in phase C) wherein phase D) comprises on of the following:
  modifying said intermediate product obtained in phase C) with a Group 13- or transition metal modifier in case an internal donor was used during phase C), in order to obtain a procatalyst;
  modifying said intermediate product obtained in phase C) with a Group 13- or transition metal modifier and an internal donor in case an activator was used during phase C), in order to obtain a procatalyst.

The procatalyst thus prepared can be used in polymerization of olefins using an external donor and a co-catalyst.

It is thus noted that the process according to the present invention is different from the prior art process by the use of a different internal donor.

The various steps used to prepare the procatalyst according to the present invention (and the prior art) are described in more detail below.

Phase A: Preparing a Solid Support for the Catalyst.

In the process of the present invention preferably a magnesium-containing support is used. Said magnesium-containing support is known in the art as a typical component of a Ziegler-Natta procatalyst. This step of preparing a solid support for the catalyst is the same as in the prior art process. The following description explains the process of preparing magnesium-based support. Other supports may be used.

Synthesis of magnesium-containing supports, such as magnesium halides, magnesium alkyls and magnesium aryls, and also magnesium alkoxy and magnesium aryloxy compounds for polyolefin production, particularly of polypropylenes production are described for instance in U.S. Pat. No. 4,978,648, WO96/32427A1, WO01/23441 Al, EP1283 222A1, EP1222 21461; U.S. Pat. Nos. 5,077,357; 5,556,820; 4,414,132; 5,106,806 and 5,077,357 but the present process is not limited to the disclosure in these documents.

Preferably, the process for preparing the solid support for the procatalyst according to the present invention comprises the following steps: step o) which is optional and step i). Step o) preparation of the Grignard reagent (optional) and Step i) reacting a Grignard compound with a silane compound.

Step o) Preparation of the Grignard Reagent (Optional).

A Grignard reagent, $R^4zMgX^4_{2-z}$ used in step i) may be prepared by contacting metallic magnesium with an organic halide $R^4X^4$, as described in WO 96/32427 A1 and WO01/23441 A1. All forms of metallic magnesium may be used, but preferably use is made of finely divided metallic magnesium, for example magnesium powder. To obtain a fast reaction it is preferable to heat the magnesium under nitrogen prior to use.

$R^4$ is a hydrocarbyl group independently selected from alkyl, alkenyl, aryl, aralkyl, alkylaryl, or alkoxycarbonyl groups, wherein said hydrocarbyl group may be linear, branched or cyclic, and may be substituted or unsubstituted; said hydrocarbyl group preferably having from 1 to 20 carbon atoms or combinations thereof. The $R^4$ group may contain one or more heteroatoms.

$X^4$ is selected from the group of consisting of fluoride (F—), chloride (Cl—), bromide (Br—) or iodide (I—). The value for z is in a range of larger than 0 and smaller than 2: $0<z<2$ Combinations of two or more organic halides $R^4X^4$ can also be used.

The magnesium and the organic halide $R^4X^4$ can be reacted with each other without the use of a separate dispersant; the organic halide $R^4X^4$ is then used in excess.

The organic halide $R^4X^4$ and the magnesium can also be brought into contact with one another and an inert dispersant. Examples of these dispersants are: aliphatic, alicyclic or aromatic dispersants containing from 4 up to 20 carbon atoms.

Preferably, in this step o) of preparing $R^4_zMgX^4_{2-z}$, also an ether is added to the reaction mixture. Examples of ethers are: diethyl ether, diisopropyl ether, dibutyl ether, diisobutyl ether, diisoamyl ether, diallyl ether, tetrahydrofuran and anisole. Dibutyl ether and/or diisoamyl ether are preferably used. Preferably, an excess of chlorobenzene is used as the organic halide $R^4X^4$. Thus, the chlorobenzene serves as dispersant as well as organic halide $R^4X^4$.

The organic halide/ether ratio acts upon the activity of the procatalyst. The chlorobenzene/dibutyl ether volume ratio may for example vary from 75:25 to 35:65, preferably from 70:30 to 50:50.

Small amounts of iodine and/or alkyl halides can be added to cause the reaction between the metallic magnesium and the organic halide $R^4X^4$ to proceed at a higher rate. Examples of alkyl halides are butyl chloride, butyl bromide and 1,2-dibromoethane. When the organic halide $R^4X^4$ is an alkyl halide, iodine and 1,2-dibromoethane are preferably used.

The reaction temperature for step o) of preparing $R^4_zMgX^4_{2-z}$ normally is from 20 to 150° C.; the reaction time is normally from 0.5 to 20 hours. After the reaction for preparing $R^4_zMgX^4_{2-z}$ is completed, the dissolved reaction product may be separated from the solid residual products. The reaction may be mixed. The stirring speed can be determined by a person skilled in the art and should be sufficient to agitate the reactants.

Step i) Reacting a Grignard Compound with a Silane Compound.

Step i): contacting a compound $R^4_zMgX^4_{2-z}$—wherein $R_4$, $X^4$, and z are as discussed herein—with an alkoxy- or aryloxy-containing silane compound to give a first intermediate reaction product. Said first intermediate reaction product is a solid magnesium-containing support.

In step i) a first intermediate reaction product is thus prepared by contacting the following reactants: * a Grignard reagent—being a compound or a mixture of compounds of formula $R^4_zMgX^4_{2-z}$ and * an alkoxy- or aryloxy-containing silane compound. Examples of these reactants are disclosed for example in WO 96/32427 A1 and WO01/23441 A1.

The compound $R^4_zMgX^4_{2-z}$ used as starting product is also referred to as a Grignard compound. In $R^4_zMgX^4_{2-z}$, $X^4$ is preferably chlorine or bromine, more preferably chlorine.

$R^4$ can be an alkyl, aryl, aralkyl, alkoxide, phenoxide, etc., or mixtures thereof. Suitable examples of group $R^4$ are methyl, ethyl, n-propyl, i-propyl, n-butyl, i-butyl, t-butyl, hexyl, cyclohexyl, octyl, phenyl, tolyl, xylyl, mesityl, benzyl, phenyl, naphthyl, thienyl, indolyl. In a preferred embodiment of the invention, $R^4$ represents an aromatic group, for instance a phenyl group.

Preferably, as Grignard compound $R^4_zMgX^4_{2-z}$ used in step i) a phenyl Grignard or a butyl Grignard is used. The selection for either the phenyl Grignard or the butyl Grignard depends on the requirements.

When Grignard compound is used, a compound according to the formula $R^4_zMgX^4_{2-z}$ is meant. When phenyl Grignard is used a compound according to the formula $R^4_zMgX^4_{2-z}$ wherein $R^4$ is phenyl, e.g. PhMgCl, is meant. When butyl Grignard is used, a compound according to the formula $R^4_zMgX^4_{2-z}$ wherein $R^4$ is butyl, e.g. BuMgCl or n-BuMgCl, is meant.

An advantage of the use of phenyl Grignard are that it is more active that butyl Grignard. Preferably, when butyl Grignard is used, an activation step using an aliphatic alcohol, such as methanol is carried out in order to increase the activity. Such an activation step may not be required with the use of phenyl Grignard. A disadvantage of the use of phenyl Grignard is that benzene rest products may be present and that it is more expensive and hence commercially less interesting.

An advantage of the use of butyl Grignard is that it is benzene free and is commercially more interesting due to the lower price. A disadvantage of the use of butyl Grignard is that in order to have a high activity, an activation step is required.

The process to prepare the procatalyst according to the present invention can be carried out using any Grignard compound, but the two stated above are the two that are most preferred.

In the Grignard compound of formula $R^4_zMgX^4_{2-z}$ z is preferably from about 0.5 to 1.5.

The compound $R^4_zMgX^4_{2-z}$ may be prepared in an optional step (step o) which is discussed above), preceding step i) or may be obtained from a different process.

It is explicitly noted that it is possible that the Grignard compound used in step i) may alternatively have a different structure, for example, may be a complex. Such complexes are already known to the skilled person in the art; a particular example of such complexes is $Phenyl_4Mg_3Cl_2$.

The alkoxy-or aryloxy-containing silane used in step i) is preferably a compound or a mixture of compounds with the general formula Si $(OR^5)_{4-n}R^6n$, wherein:

It should be noted that the $R^5$ group is the same as the $R^1$ group. The $R^1$ group originates from the $R^5$ group during the synthesis of the first intermediate reaction product.

$R^5$ is a hydrocarbyl group independently selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 12 carbon atoms, even more preferably from 1 to 6 carbon atoms. Preferably, said hydrocarbyl group is an alkyl group, preferably having from 1 to 20 carbon atoms, more preferably from 1 to 12 carbon atoms, even more preferably from 1 to 6 carbon atoms, such as for example methyl, ethyl, n-propyl, isopropyl, n-butyl, sec-butyl, iso-butyl, tert-butyl, pentyl or hexyl; most preferably, selected from ethyl and methyl.

$R^6$ is a hydrocarbyl group independently selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 12 carbon atoms, even more preferably from 1 to 6 carbon atoms. Preferably, said hydrocarbyl group is an alkyl group, preferably having from 1 to 20 carbon atoms, more preferably from 1 to 12 carbon atoms, even more preferably from 1 to 6 carbon atoms, such as for example methyl, ethyl, n-propyl, isopropyl, n-butyl, sec-butyl, iso-butyl, tert-butyl, or cyclopentyl.

The value for n is in the range of 0 up to 3, preferably n is from 0 up to and including 1.

Examples of suitable silane-compounds include tetramethoxysilane, tetraethoxysilane, methyltrimethoxysilane, methyltributoxysilane, phenyltriethoxy-silane, diethyldiphenoxysilane, n-propyltriethoxysilane, diisopropyldimethoxysilane, diisobutyldimethoxysilane, n-propyltrimethoxysilane, cyclohexyl-methyldimethoxysilane, dicyclopentyldimethoxy-silane, isobutylisopropyldimethoxyl-silane, phenyl-trimethoxysilane, diphenyl-dimethoxysilane, trifluoropropylmethyl-dimethoxysilane, bis(perhydroisoquinolino)-dimethoxysilane, dicyclohexyldimethoxysilane, dinorbornyl-dimethoxysilane, di(n-propyl)dimethoxysilane, di(iso-propyl)-dimethoxysilane, di(n-butyl)dimethoxysilane and/or di(iso-butyl)dimethoxysilane.

Preferably, tetraethoxy-silane is used as silane-compound in preparing the solid Mg-containing compound during step i) in the process according to the present invention.

Preferably, in step i) the silane-compound and the Grignard compound are introduced simultaneously to a mixing device to result in particles of the first intermediate reaction product having advantageous morphology. This is for example described in WO 01/23441 A1. Here, 'morphology' does not only refer to the shape of the particles of the solid Mg-compound and the catalyst made therefrom, but also to the particle size distribution (also characterized as span), its fines content, powder flowability, and the bulk density of the catalyst particles. Moreover, it is well known that a polyolefin powder produced in polymerization process using a catalyst system based on such procatalyst has a similar morphology as the procatalyst (the so-called "replica effect"; see for instance S. van der Ven, Polypropylene and other Polyolefins, Elsevier 1990, p. 8-10). Accordingly, almost round polymer particles are obtained with a length/diameter ratio (I/D) smaller than 2 and with good powder flowability.

As discussed above, the reactants are preferably introduced simultaneously. With "introduced simultaneously" is meant that the introduction of the Grignard compound and the silane-compound is done in such way that the molar ratio Mg/Si does not substantially vary during the introduction of these compounds to the mixing device, as described in WO 01/23441 A1.

The silane-compound and Grignard compound can be continuously or batch-wise introduced to the mixing device. Preferably, both compounds are introduced continuously to a mixing device.

The mixing device can have various forms; it can be a mixing device in which the silane-compound is premixed with the Grignard compound, the mixing device can also be a stirred reactor, in which the reaction between the compounds takes place. The separate components may be dosed to the mixing device by means of peristaltic pumps.

Preferably, the compounds are premixed before the mixture is introduced to the reactor for step i). In this way, a procatalyst is formed with a morphology that leads to polymer particles with the best morphology (high bulk density, narrow particle size distribution, (virtually) no fines, excellent flowability).

The Si/Mg molar ratio during step i) may range from 0.2 to 20. Preferably, the Si/Mg molar ratio is from 0.4 to 1.0.

The period of premixing of the reactants in above indicated reaction step may vary between wide limits, for instance 0.1 to 300 seconds. Preferably, premixing is performed during 1 to 50 seconds.

The temperature during the premixing step of the reactants is not specifically critical, and may for instance range from 0 to 80° C.; preferably the temperature is from 10° C. to 50° C.

The reaction between said reactants may, for instance, take place at a temperature from −20° C. to 100° C.; for example at a temperature of from 0° C. to 80° C. The reaction time is for example from 1 to 5 hours.

The mixing speed during the reaction depends on the type of reactor used and the scale of the reactor used. The mixing speed can be determined by a person skilled in the art. As a non-limiting example, mixing may be carried out at a mixing speed of from 250 to 300 rpm. In an embodiment, when a blade stirrer is used the mixing speed is from 220 to 280 rpm and when a propeller stirrer is used the mixing speed is from 270 to 330 rpm. The stirrer speed may be increased during the reaction. For example, during the dosing, the speed of stirring may be increased every hour by 20-30 rpm.

Preferably, PhMgCl or n-BuMgCl is the Grignard agent used in step i).

The first intermediate reaction product obtained from the reaction between the silane compound and the Grignard compound is usually purified by decanting or filtration followed by rinsing with an inert solvent, for instance a hydrocarbon solvent with for example 1-20 carbon atoms, like pentane, iso-pentane, hexane or heptane. The solid product can be stored and further used as a suspension in said inert solvent. Alternatively, the product may be dried, preferably partly dried, and preferably under mild conditions; e.g. at ambient temperature and pressure.

The first intermediate reaction product obtained by this step i) may comprise a compound of the formula $Mg(OR^1)_x X^1_{2-x}$, wherein:

$R^1$ is a hydrocarbyl group independently selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 12 carbon atoms, even more preferably from 1 to 6 carbon atoms. Preferably, said hydrocarbyl group is an alkyl group, preferably having from 1 to 20 carbon atoms, more preferably from 1 to 12 carbon atoms, even more preferably from 1 to 6 carbon atoms. Most preferably selected from ethyl and methyl.

$X^1$ is selected from the group of consisting of fluoride (F—), chloride (Cl—), bromide (Br—) or iodide (I—). Preferably, $X^1$ is chloride or bromine and more preferably, $X^1$ is chloride.

The value for x is in the range of larger than 0 and smaller than 2: $0<z<2$. The value for x is preferably from 0.5 to 1.5.

Phase B: Activating said Solid Support for the Catalyst.

This step of activating said solid support for the catalyst is an optional step that is not required, but is preferred, in the present invention. If this step of activation is carried out, preferably, the process for activating said solid support comprises the following step ii). This phase may comprise one or more stages.

Step ii) Activation of the Solid Magnesium Compound.

Step ii): contacting the solid $Mg(OR^1)_x X^1_{2-x}$ with at least one activating compound selected from the group formed by activating electron donors and metal alkoxide compounds of formula $M^1(OR^2)_{v-w}(OR^3)_w$ or $M^2(OR^2)_{v-w}(R^3)_w$, wherein:

$R^2$ is a hydrocarbyl group independently selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 12 carbon atoms, even more preferably from 1 to 6 carbon atoms. Preferably, said hydrocarbyl group is an alkyl group, preferably having from 1 to 20 carbon atoms, more preferably from 1 to 12 carbon atoms, even more preferably from 1 to 6 carbon atoms, such as for example methyl, ethyl, n-propyl, isopropyl, n-butyl, sec-butyl, iso-butyl, tert-butyl, pentyl or hexyl; most preferably selected from ethyl and methyl.

R³ is a hydrocarbyl group independently selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 12 carbon atoms, even more preferably from 1 to 6 carbon atoms. Preferably, said hydrocarbyl group is an alkyl group, preferably having from 1 to 20 carbon atoms, more preferably from 1 to 12 carbon atoms, even more preferably from 1 to 6 carbon atoms; most preferably selected from methyl, ethyl, n-propyl, isopropyl, n-butyl, sec-butyl, iso-butyl, tert-butyl, and cyclopentyl.

$M^1$ is a metal selected from the group consisting of Ti, Zr, Hf, Al or Si; v is the valency of $M^1$; $M^2$ is a metal being Si; v is the valency of $M^2$ and v being either 3 or 4 and w is smaller than v.

The electron donors and the compounds of formula $M^1(OR^2)_{v-w}(OR^3)_w(OR^3)_w$ and $M^2(OR^2)_{v-w}(R^3)_w$ may be also referred herein as activating compounds.

In this step either one or both types of activating compounds (viz. activating electron donor or metal alkoxides) may be used.

The advantage of the use of this activation step prior to contacting the solid support with the halogen-containing titanium compound (process phase C) is that a higher yield of polyolefins is obtained per gram of the procatalyst. Moreover, the ethylene sensitivity of the catalyst system in the copolymerisation of propylene and ethylene is also increased because of this activation step. This activation step is disclosed in detail in WO2007/134851 of the present applicant.

Examples of suitable activating electron donors that may be used in step ii) are known to the skilled person and described herein below, i.e. include carboxylic acids, carboxylic acid anhydrides, carboxylic acid esters, carboxylic acid halides, alcohols, ethers, ketones, amines, amides, nitriles, aldehydes, alkoxides, sulphonamides, thioethers, thioesters and other organic compounds containing one or more hetero atoms, such as nitrogen, oxygen, sulphur and/or phosphorus.

Preferably, an alcohol is used as the activating electron donor in step ii). More preferably, the alcohol is a linear or branched aliphatic or aromatic alcohol having 1-12 carbon atoms. Even more preferably, the alcohol is selected from methanol, ethanol, butanol, isobutanol, hexanol, xylenol and benzyl alcohol. Most preferably, the alcohol is ethanol or methanol, preferably ethanol.

Suitable carboxylic acids as activating electron donor may be aliphatic or (partly) aromatic. Examples include formic acid, acetic acid, propionic acid, butyric acid, isobutanoic acid, acrylic acid, methacrylic acid, maleic acid, fumaric acid, tartaric acid, cyclohexanoic monocarboxylic acid, cis-1,2-cyclohexanoic dicarboxylic acid, phenylcarboxylic acid, toluenecarboxylic acid, naphthalene carboxylic acid, phthalic acid, isophthalic acid, terephthalic acid and/or trimellitic acid.

Anhydrides of the aforementioned carboxylic acids can be mentioned as examples of carboxylic acid anhydrides, such as for example acetic acid anhydride, butyric acid anhydride and methacrylic acid anhydride.

Suitable examples of esters of above-mentioned carboxylic acids are formates, for instance, butyl formate; acetates, for instance ethyl acetate and butyl acetate; acrylates, for instance ethyl acrylate, methyl methacrylate and isobutyl methacrylate; benzoates, for instance methylbenzoate and ethylbenzoate; methyl-p-toluate; ethyl-naphthate and phthalates, for instance monomethyl phthalate, dibutyl phthalate, diisobutyl phthalate, diallyl phthalate and/or diphenyl phthalate.

Examples of suitable carboxylic acid halides as activating electron donors are the halides of the carboxylic acids mentioned above, for instance acetyl chloride, acetyl bromide, propionyl chloride, butanoyl chloride, butanoyl iodide, benzoyl bromide, p-toluyl chloride and/or phthaloyl dichloride.

Suitable alcohols are linear or branched aliphatic alcohols with 1-12 C-atoms, or aromatic alcohols. Examples include methanol, ethanol, butanol, isobutanol, hexanol, xylenol and benzyl alcohol. The alcohols may be used alone or in combination. Preferably, the alcohol is ethanol or hexanol.

Examples of suitable ethers are diethers, such as for example 2-ethyl-2-butyl-1,3-dimethoxypropane, 2-isopropyl-2-isopentyl-1,3-dimethoxypropane and/or 9,9-bis(methoxymethyl)fluorene. Also, cyclic ethers like tetrahydrofuran (THF), or tri-ethers can be used.

Suitable examples of other organic compounds containing a heteroatom as activating electron donor include 2,2,6,6-tetramethyl piperidine, 2,6-dimethylpiperidine, pyridine, 2-methylpyridine, 4-methylpyridine, imidazole, benzonitrile, aniline, diethylamine, dibutylamine, dimethylacetamide, thiophenol, 2-methyl thiophene, isopropyl mercaptan, diethylthioether, diphenylthioether, tetrahydrofuran, dioxane, dimethylether, diethylether, anisole, acetone, triphenylphosphine, triphenylphosphite, diethylphosphate and/or diphenylphosphate.

Examples of suitable metal alkoxides for use in step ii) are metal alkoxides of formulas: $M^1(OR^2)_{v-w}(OR^3)_w$ and $M^2(OR^2)_{v-w}(R^3)_w$ wherein $M^1$, $M^2$, $R^2$, $R^3$, v, and w are as defined herein. $R^2$ and $R^3$ can also be aromatic hydrocarbon groups, optionally substituted with e.g. alkyl groups and can contain for example from 6 to 20 carbon atoms. The $R^2$ and $R^3$ preferably comprise 1-12 or 1-8 carbon atoms. In preferred embodiments $R^2$ and $R^3$ are ethyl, propyl or butyl; more preferably all groups are ethyl groups.

Preferably, $M^1$ in said activating compound is Ti or Si. Si-containing compounds suitable as activating compounds are the same as listed above for step i).

The value of w is preferably 0, the activating compound being for example a titanium tetraalkoxide containing 4-32 carbon atoms in total from four alkoxy groups. The four alkoxide groups in the compound may be the same or may differ independently. Preferably, at least one of the alkoxy groups in the compound is an ethoxy group. More preferably the compound is a tetraalkoxide, such as titanium tetraethoxide.

In the preferred process to prepare the procatalyst, one activating compound can be used, but also a mixture of two or more compounds may be used.

A combination of a compound of $M^1(OR^2)_{v-w}(OR^3)_w$ or $M^2(OR^2)_{v-w}(R^3)_w$ with an electron donor is preferred as activating compound to obtain a catalyst system that for example shows high activity, and of which the ethylene sensitivity can be affected by selecting the internal donor; which is specifically advantageous in preparing copolymers of for example propylene and ethylene.

Preferably, a Ti-based compound, for example titanium tetraethoxide, is used together with an alcohol, like ethanol or hexanol, or with an ester compound, like ethylacetate, ethylbenzoate or a phthalate ester, or with pyridine.

If two or more activating compounds are used in step ii) their order of addition is not critical, but may affect catalyst performance depending on the compounds used. A skilled person may optimize their order of addition based on some experiments. The compounds of step ii) can be added together or sequentially.

Preferably, an electron donor compound is first added to the compound with formula $Mg(OR^1)_xX^1_{2-x}$ where after a compound of formula $M^1(OR^2)_{v-w}(OR^3)_w$ or $M^2(OR^2)_{v-w}(R^3)_w$ as defined herein is added. The activating compounds preferably are added slowly, for instance during a period of 0.1-6, preferably during 0.5-4 hours, most preferably during 1-2.5 hours, each.

The first intermediate reaction product that is obtained in step i) can be contacted—when more than one activating compound is used—in any sequence with the activating compounds. In one embodiment, an activating electron donor is first added to the first intermediate reaction product and then the compound $M^1(OR^2)_{v-w}(OR^3)_w$ or $M^2(OR^2)_{v-w}(R^3)_w$ is added; in this order no agglomeration of solid particles is observed. The compounds in step ii) are preferably added slowly, for instance during a period of 0.1-6, preferably during 0.5-4 hours, most preferably during 1-2.5 hours, each.

The molar ratio of the activating compound to $Mg(OR^1)_x X^1_{2-x}$ may range between wide limits and is, for instance, from 0.02 to 1.0. Preferably, the molar ratio is from 0.05 to 0.5, more preferably from 0.06 to 0.4, or even from 0.07 to 0.2.

The temperature in step ii) can be in the range from −20° C. to 70° C., preferably from −10° C. to 50° C., more preferably in the range from −5° C. to 40° C., and most preferably in the range from 0° C. to 30° C.

Preferably, at least one of the reaction components is dosed in time, for instance during 0.1 to 6, preferably during 0.5 to 4 hours, more particularly during 1-2.5 hours.

The reaction time after the activating compounds have been added is preferably from 0 to 3 hours.

The mixing speed during the reaction depends on the type of reactor used and the scale of the reactor used. The mixing speed can be determined by a person skilled in the art and should be sufficient to agitate the reactants.

The inert dispersant used in step ii) is preferably a hydrocarbon solvent. The dispersant may be for example an aliphatic or aromatic hydrocarbon with 1-20 carbon atoms. Preferably, the dispersant is an aliphatic hydrocarbon, more preferably pentane, iso-pentane, hexane or heptane, heptane being most preferred.

Starting from a solid Mg-containing product of controlled morphology obtained in step i), said morphology is not negatively affected during treatment with the activating compound during step ii). The solid second intermediate reaction product obtained in step ii) is considered to be an adduct of the Mg-containing compound and the at least one activating compound as defined in step ii), and is still of controlled morphology.

The obtained second intermediate reaction product after step ii) may be a solid and may be further washed, preferably with the solvent also used as inert dispersant; and then stored and further used as a suspension in said inert solvent. Alternatively, the product may be dried, preferably partly dried, preferably slowly and under mild conditions; e.g. at ambient temperature and pressure.

Phase C: Contacting said Solid Support with the Catalytic Species and one or more Internal Donors or an Activator.

Phase C: contacting the solid support with a catalytic species. This step can take different forms, such as i) contacting said solid support with the catalytic species and one or more internal donors to obtain said procatalyst; ii) contacting said solid support with a catalytic species and one or more internal donors to obtain an intermediate product; iii) contacting said solid support with a catalytic species and an activator to obtain an intermediate product.

Phase C may comprise several stages. During each of these consecutive stages the solid support is contacted with said catalytic species. In other words, the addition or reaction of said catalytic species may be repeated one or more times.

For example, during stage I of phase C said solid support (first intermediate) or the activated solid support (second intermediate) is first contacted with said catalytic species and optionally subsequently with an internal donor. When a second stage is present, during stage II the intermediate product obtained from stage I will be contacted with additional catalytic species which may the same or different than the catalytic species added during the first stage and optionally an internal donor. In case three stages are present, stage III is preferably a repetition of stage II or may comprise the contacting of the product obtained from stage II with both a catalytic species (which may be the same or different as above) and an internal donor. In other words, an internal donor may be added during each of these stages or during two or more of these stages. When an internal donor is added during more than one stage it may be the same or a different internal donor. An internal donor according to Formula A is added during at least one of the stages of Phase C.

An activator according to the present invention—if used—may be added either during stage I or stage II or stage III. An activator may also be added during more than one stage.

Preferably, the process of contacting said solid support with the catalytic species and an internal donor comprises the following step iii).

Step iii) Reacting the Solid Support with a Transition Metal Halide

Step iii) reacting the solid support with a transition metal halide (e.g. titanium, chromium, hafnium, zirconium, vanadium) but preferably titanium halide. In the discussion below only the process for a titanium-base Ziegler-Natta procatalyst is disclosed, however, the application is also applicable to other types of Ziegler-Natta procatalysts.

Step iii): contacting the first or second intermediate reaction product, obtained respectively in step i) or ii), with a halogen-containing Ti-compound and optionally an internal electron donor or activator to obtain a third intermediate product.

Step iii) can be carried out after step i) on the first intermediate product or after step ii) on the second intermediate product.

The molar ratio in step iii) of the transition metal to the magnesium preferably is from 10 to 100, most preferably, from 10 to 50.

Preferably, an internal electron donor is also present during step iii). Also mixtures of internal electron donors can be used. Examples of internal electron donors are disclosed below.

The molar ratio of the internal electron donor relative to the magnesium may vary between wide limits, for instance from 0.01 to 0.75. Preferably, this molar ratio is from 0.02 to 0.4; more preferably from 0.03 to 0.2; and most preferably from 0.04 to 0.08.

During contacting the second intermediate product and the halogen-containing titanium compound, an inert dispersant is preferably used. The dispersant preferably is chosen such that virtually all side products formed are dissolved in the dispersant. Suitable dispersants include for example aliphatic and aromatic hydrocarbons and halogenated aromatic solvents with for instance 4-20 carbon atoms. Examples include toluene, xylene, benzene, heptane, o-chlorotoluene and chlorobenzene.

The reaction temperature during step iii) is preferably from 0° C. to 150° C., more preferably from 50° C. to 150° C., and more preferably from 100° C. to 140° C. Most preferably, the reaction temperature is from 110° C. to 125° C.

The reaction time during step iii) is preferably from 10 minutes to 10 hours. In case several stages are present, each stage can have a reaction time from 10 minutes to 10 hours. The reaction time can be determined by a person skilled in the art based on the reactor and the procatalyst.

The mixing speed during the reaction depends on the type of reactor used and the scale of the reactor used. The mixing speed can be determined by a person skilled in the art and should be sufficient to agitate the reactants.

The obtained reaction product may be washed, usually with an inert aliphatic or aromatic hydrocarbon or halogenated aromatic compound, to obtain the procatalyst of the invention. If desired the reaction and subsequent purification steps may be repeated one or more times. A final washing is preferably performed with an aliphatic hydrocarbon to result in a suspended or at least partly dried procatalyst, as described above for the other steps.

Optionally an activator is present during step iii) of Phase C instead of an internal donor, this is explained in more detail below in the section of activators.

The molar ratio of the activator relative to the magnesium may vary between wide limits, for instance from 0.02 to 0.5. Preferably, this molar ratio is from 0.05 to 0.4; more preferably from 0.1 to 0.3; and most preferably from 0.1 to 0.2.

Phase D: Modifying said Intermediate Product with a Metal-Based Modifier.

This phase D is optional in the present invention. In a preferred process for modifying the supported catalyst, this phase consists of the following steps: Step iv) modifying the third intermediate product with a metal-modifier to yield a modified intermediate product; Step v) contacting said modified intermediate product with a titanium halide and optionally on or more internal donors to obtain the present procatalyst.

The order of addition, viz. the order of first step iv) and subsequently step v) is considered to be very important to the formation of the correct clusters of Group 13- or transition metal and titanium forming the modified and more active catalytic center.

Each of these steps is disclosed in more detail below. It should be noted that the steps iii), iv) and v) (viz. phases C and D) are preferably carried out in the same reactor, viz. in the same reaction mixture, directly following each other.

Preferably step iv) is carried out directly after step iii) in the same reactor. Preferably, step v) is carried out directly after step iv) in the same reactor.

Step iv): Group 13- or Transition Metal Modification

The modification with Group 13- or transition metal, preferably aluminium, ensures the presence of Group 13- or transition metal in the procatalyst, in addition to magnesium (from the solid support) and titanium (from the titanation treatment).

Without wishing to be bound by any particular theory, the present inventors believe that one possible explanation is that the presence of Group 13- or transition metal increases the reactivity of the active site and hence increases the yield of polymer.

Step iv) comprises modifying the third intermediate product obtained in step iii) with a modifier having the formula $MX_3$, wherein M is a metal selected from the Group 13 metals and transition metals of the IUPAC periodic table of elements, and wherein X is a halide to yield a modified intermediate product.

Step iv) is preferably carried out directly after step iii), more preferably in the same reactor and preferably in the same reaction mixture. In an embodiment, a mixture of aluminum trichloride and a solvent, e.g. chlorobenzene, is added to the reactor after step iii) has been carried out. After the reaction has completed a solid is allowed to settle which can either be obtained by decanting or filtration and optionally purified or a suspension of which in the solvent can be used for the following step, viz. step v).

The metal modifier is preferably selected from the group of aluminium modifiers (e.g. aluminium halides), boron modifiers (e.g. boron halides), gallium modifiers (e.g. gallium halides), zinc modifiers (e.g. zinc halides), copper modifiers (e.g. copper halides), thallium modifiers (e.g. thallium halides), indium modifiers (e.g. indium halides), vanadium modifiers (e.g. vanadium halides), chromium modifiers (e.g. chromium halides), iron modifiers (e.g. iron halides).

Examples of suitable modifiers are aluminum trichloride, aluminum tribromide, aluminum triiodide, aluminum trifluoride, boron trichloride, boron tribromide boron triiodide, boron trifluoride, gallium trichloride, gallium tribromide, gallium triiodide, gallium trifluoride, zinc dichloride, zinc dibromide, zinc diiodide, zinc difluoride, copper dichloride, copper dibromide, copper diiodide, copper difluoride, copper chloride, copper bromide, copper iodide, copper fluoride, thallium trichloride, thallium tribromide, thallium triiodide, thallium trifluoride, thallium chloride, thallium bromide, thallium iodide, thallium fluoride, Indium trichloride, indium tribromide, indium triiodide, indium trifluoride, vanadium trichloride, vanadium tribromide, vanadium triiodide, vanadium trifluoride, chromium trichloride, chromium dichloride, chromium tribromide, chromium dibromide, iron dichloride, iron trichloride, iron tribromide, iron dichloride, iron triiodide, iron diiodide, iron trifluoride, iron difluoride.

The amount of metal halide added during step iv) may vary according to the desired amount of metal present in the procatalyst. It may for example range from 0.01 to 5 wt. % based on the total weight of the support, preferably from 0.1 to 0.5 wt. % was carried out directly after step iii) in the same reactor.

The metal halide is preferably mixed with a solvent prior to the addition to the reaction mixture. The solvent for this step may be selected from for example aliphatic and aromatic hydrocarbons and halogenated aromatic solvents with for instance 4-20 carbon atoms. Examples include toluene, xylene, benzene, decane, o-chlorotoluene and chlorobenzene. The solvent may also be a mixture or two or more thereof.

The duration of the modification step may vary from 1 minute to 120 minutes, preferably from 40 to 80 minutes, more preferably from 50 to 70 minutes. This time is dependent on the concentration of the modifier, the temperature, the type of solvent used etc.

The modification step is preferably carried out at elevated temperatures (e.g. from 50 to 120° C., preferably from 90 to 110° C.).

The modification step may be carried out while stirring. The mixing speed during the reaction depends on the type of reactor used and the scale of the reactor used. The mixing speed can be determined by a person skilled in the art. As a non-limiting example, mixing may be carried at a stirring speed from 100 to 400 rpm, preferably from 150 to 300 rpm, more preferably about 200 rpm).

The wt/vol ratio for the metal halide and the solvent in step iv) is from 0.01 gram –0.1 gram : 5.0-100 ml.

The modified intermediate product is present in a solvent. It can be kept in that solvent after which the following step v) is directly carried out. However, it can also be isolated and/or purified. The solid can be allowed to settle by stopping the stirring. The supernatant can then be removed by decanting. Otherwise, filtration of the suspension is also possible. The solid product may be washed once or several times with the same solvent used during the reaction or another solvent selected from the same group described above. The solid may be resuspended or may be dried or partially dried for storage.

Subsequent to this step, step v) is carried out to produce the procatalyst according to the present invention.

Step v): Additional Treatment of Intermediate Product.

This step is very similar to step iii). It contains the additional treatment of the modified intermediate product.

Step v) contacting said modified intermediate product obtained in step iv) with a halogen-containing titanium compound to obtain the procatalyst according to the present invention. When an activator is used during step iii) an internal donor is used during this step.

Step v) is preferably carried out directly after step iv), more preferably in the same reactor and preferably in the same reaction mixture.

In an embodiment, at the end of step iv) or at the beginning of step v) the supernatant was removed from the solid modified intermediate product obtained in step iv) by filtration or by decanting. To the remaining solid, a mixture of titanium halide (e.g. tetrachloride) and a solvent (e.g. chlorobenzene) can be added. The reaction mixture is subsequently kept at an elevated temperature (e.g. from 100 to 130° C., such as 115° C.) for a certain period of time (e.g. from 10 to 120 minutes, such as from 20 to 60 minutes, e.g. 30 minutes). After this, a solid substance was allowed to settle by stopping the stirring.

The molar ratio of the transition metal to the magnesium preferably is from 10 to 100, most preferably, from 10 to 50.

Optionally, additional internal electron donor may also present during this step. Also mixtures of internal electron donors can be used. The molar ratio of the internal electron donor relative to the magnesium may vary between wide limits, for instance from 0.02 to 0.75. Preferably, this molar ratio is from 0.05 to 0.4; more preferably from 0.1 to 0.4; and most preferably from 0.1 to 0.3.

The solvent for this step may be selected from for example aliphatic and aromatic hydrocarbons and halogenated aromatic solvents with for instance 4-20 carbon atoms. The solvent may also be a mixture or two or more thereof.

According to a preferred embodiment of the present invention this step v) is repeated, in other words, the supernatant is removed as described above and a mixture of titanium halide (e.g. tetrachloride) and a solvent (e.g. chlorobenzene) is added. The reaction is continued at elevated temperatures during a certain time which can be same or different from the first time step v) is carried out.

The step may be carried out while stirring. The mixing speed during the reaction depends on the type of reactor used and the scale of the reactor used. The mixing speed can be determined by a person skilled in the art. This can be the same as discussed above for step iii).

Thus, step v) can be considered to consist of at least two sub steps in this embodiment, being:

v-a) contacting said modified intermediate product obtained in step iv) with titanium tetrachloride—optionally using an internal donor—to obtain a partially titanated procatalyst;

v-b) contacting said partially titanated procatalyst obtained in step v-a) with titanium tetrachloride to obtain the procatalyst.

Additional sub steps can be present to increase the number of titanation steps to four or higher.

The solid substance (procatalyst) obtained was washed several times with a solvent (e.g. heptane), preferably at elevated temperature, e.g. from 40 to 100° C. depending on the boiling point of the solvent used, preferably from 50 to 70° C. After this, the procatalyst, suspended in solvent, was obtained. The solvent can be removed by filtration or decantation. The procatalyst can be used as such wetted by the solvent or suspended in solvent or it can be first dried, preferably partly dried, for storage. Drying can e.g. be carried out by low pressure nitrogen flow for several hours.

Thus in this embodiment, the total titanation treatment comprises three phases of addition of titanium halide. Wherein the first phase of addition is separated from the second and third phases of addition by the modification with metal halide.

It could be said that the difference between the prior art and the present invention is that the titanation step (viz. the step of contacting with a titanium halide) according to the present invention is split into two parts and a Group 13- or transition metal modification step is introduced between the two parts or stages of the titanation. Preferably, the first part of the titanation comprises one single titanation step and the second part of the titanation comprises two subsequent titanation steps. When this modification is carried out before the titanation step the increase in activity was higher as observed by the inventors. When this modification is carried out after the titanation step the increase in activity was less as observed by the present inventors.

In short, an embodiment of the present invention comprises the following steps: i) preparation of first intermediate reaction product; ii) activation of solid support to yield second intermediate reaction product; iii) first titanation or Stage I to yield third intermediate reaction product; iv) modification to yield modified intermediate product; v) second titanation or Stage II/III to yield the procatalyst.

The procatalyst may have a titanium, hafnium, zirconium, chromium or vanadium (preferably titanium) content of from about 0.1 wt % to about 6.0 wt %, based on the total solids weight, or from about 1.0 wt % to about 4.5 wt %, or from about 1.5 wt % to about 3.5 wt %.

The weight ratio of titanium, hafnium, zirconium, chromium or vanadium (preferably titanium) to magnesium in the solid procatalyst may be from about 1:3 to about 1:160, or from about 1:4 to about 1:50, or from about 1:6 to 1:30. Weight percentage is based on the total weight of the procatalyst.

This process according to the present invention results in a procatalyst having a high hydrogen sensitivity which allow obtaining polyolefins, preferably polypropylene having a medium molecular weight distribution.

The transition metal-containing solid catalyst compound according to the present invention comprises a transition metal halide (e.g. titanium halide, chromium halide, hafnium halide, zirconium halide, vanadium halide) supported on a metal or metalloid compound (e.g. a magnesium compound or a silica compound).

Preferably, a magnesium-based or magnesium-containing support is used in the present invention. Such a support is prepared from magnesium-containing support-precursors, such as magnesium halides, magnesium alkyls and magnesium aryls, and also magnesium alkoxy and magnesium aryloxy compounds.

The support may be activated using activation compounds as described in more detail above under Phase B.

The intermediate product may further be activated during Phase C as discussed above for the process. This activation increases the yield of the resulting procatalyst in olefin polymerisation.

Several activators can be used, such as benzamide, alkylbenzoates, and monoesters. Each of these will be discussed below.

A benzamide activator has a structure according to formula X:

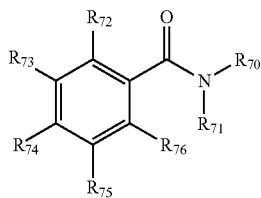

$R^{70}$ and $R^{71}$ are each independently selected from hydrogen or an alkyl. Preferably, said alkyl has from 1 to 6 carbon atoms, more preferably from 1 to 3 carbon atoms. More preferably, $R^{70}$ and $R^{71}$ are each independently selected from hydrogen or methyl.

$R^{72}$, $R^{73}$, $R^{74}$, $R^{75}$, $R^{76}$ are each independently selected from hydrogen, a heteroatom (preferably a halide), or a hydrocarbyl group, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 10 carbon atoms, more preferably from 1 to 8 carbon atoms, even more preferably from 1 to 6 carbon atoms.

Suitable non-limiting examples of "benzamides" include benzamide ($R^{70}$ and $R^{71}$ are both hydrogen and each of $R^{72}$, $R^{73}$, $R^{74}$, $R^{75}$, $R^{76}$ are hydrogen) also denoted as BA-2H or methylbenzamide ($R^{70}$ is hydrogen; $R^{71}$ is methyl and each of $R^{72}$, $R^{73}$, $R^{74}$, $R^{75}$, $R^{76}$ are hydrogen) also denoted as BA-HMe or dimethylbenzamide ($R^{70}$ and $R^{71}$ are methyl and each of $R^{72}$, $R^{73}$, $R^{74}$, $R^{75}$, $R^{76}$ are hydrogen) also denoted as BA-2Me. Other examples include monoethylbenzamide, diethylbenzamide, methylethylbenzamide, 2-(trifluor-methyl)benzamide, N,N-dimethyl-2-(trifluormethyl)benzamide, 3-(trifluormethyl)-benzamide, N,N-dimethyl-3-(trifluormethyl)benzamide, 2,4-dihydroxy-N-(2-hydroxyethyl)-benzamide, N-(1H-benzotriazol-1-ylmethyl)benzamide, 1-(4-ethylbenzoyl)piperazine, 1-benzoylpiperidine.

Without wishing to be bound by a particular theory the present inventors believe that the fact that the most effective activation is obtained when the benzamide activator is added during stage I has the following reason. It is believed that the benzamide activator will bind the catalytic species and is later on substituted by the internal donor when the internal donor is added.

Alkylbenzoates may be used as activators. The activator may hence be selected from the group alkylbenzoates having an alkylgroup having from 1 to 10, preferably from 1 to 6 carbon atoms. Examples of suitable alkyl benzoates are methylbenzoate, ethylbenzoate according to Formula II, n-propylbenzoate, iso-propylbenzoate, n-butylbenzoate, 2-butylbenzoate, t-butylbenzoate.

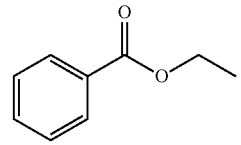

Formula II

More preferably, the activator is ethylbenzoate.

Mono-esters may be used as activators. The monoester according to the present invention can be any ester of a monocarboxylic acid known in the art. The structures according to Formula V are also mono-esters but are not explained in this section, see the section on Formula V. The monoester can have the formula XXIII:

$$R^{94}\text{—CO—OR}^{95}$$
Formula XXIII $R^{94}$ and $R^{95}$ are each independently selected from a hydrogen or a hydrocarbyl group selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 10 carbon atoms, more preferably from 1 to 8 carbon atoms, even more preferably from 1 to 6 carbon atoms. When $R^{94}$ is an aryl, this structure is similar to Formula V. Examples of aromatic mono-esters are discussed with reference to formula V.

Preferably said mono-ester is an aliphatic monoester. Suitable examples of mono-esters include formates, for instance, butyl formate; acetates, for instance ethyl acetate, amyl acetate and butyl acetate; acrylates, for instance ethyl acrylate, methyl methacrylate and isobutyl methacrylate. More preferably, the aliphatic monoester is an acetate. Most preferably, the aliphatic monoester is ethyl acetate.

In an embodiment, the monoester used in step iii) is an ester of an aliphatic monocarboxylic acid having from 1 to 10 carbon atoms. Wherein $R^{94}$ is an aliphatic hydrocarbyl group.

The molar ratio between the monoester in step iii) and Mg may range from 0.05 to 0.5, preferably from 0.1 to 0.4, and most preferably from 0.15 to 0.25.

The monoester is not used as a stereospecificity agent, like usual internal donors are known to be in the prior art. The monoester is used as an activator.

Without to be bound by any theory, the inventors believe that the monoester used in the process according to the present invention participates at the formation of the magnesium halogen (e.g. $MgCl_2$) crystallites during the interaction of Mg-containing support with titanium halogen (e.g. $TiCl_4$). The monoester may form intermediate complexes with Ti and Mg halogen compounds (for instance, $TiCl_4$, $TiCl_3(OR)$, $MgCl_2$, $MgCl(OEt)$, etc.), help to the removal of titanium products from solid particles to mother liquor and affect the activity of final catalyst. Therefore, the monoester according to the present invention can also be referred to as an activator.

The catalyst system according to the present invention includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990).

The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst represented by the Fischer projection of the formula $R^{20}{}_3Al$.

$R^{20}$ is independently selected from a hydrogen or a hydrocarbyl, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 12 carbon atoms, even more preferably from 1 to 6 carbon atoms. On the proviso that at least one $R^{20}$ is a hydrocarbyl group. Optionally, two or three $R^{20}$ groups are joined in a cyclic radical forming a heterocyclic structure.

Non-limiting examples of suitable $R^{20}$ groups are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, methylnapthyl, cyclohexyl, cycloheptyl, and cyclooctyl.

Suitable examples of the hydrocarbyl aluminum compounds as co-catalyst include triisobutylaluminum, trihexylaluminum, di-isobutylaluminum hydride, dihexylaluminum hydride, isobutylaluminum dihydride, hexylaluminum dihydride, diisobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. In an embodiment, the cocatalyst is selected from triethylaluminum, triisobutylaluminum, trihexylaluminum, di-isobutylaluminum hydride and dihexylaluminum hydride. More preferably, trimethylaluminium, triethylaluminium, triisobutylaluminium, and/or trioctylaluminium. Most preferably, triethylaluminium (abbreviated as TEAL).

Preferably, the co-catalyst is triethylaluminum. The molar ratio of aluminum to titanium may be from about 5:1 to about 500:1 or from about 10:1 to about 200:1 or from about 15:1 to about 150:1 or from about 20:1 to about 100:1. The molar ratio of aluminum to titanium is preferably about 45:1.

One of the functions of an external donor compound is to affect the stereoselectivity of the catalyst system in polymerization of olefins having three or more carbon atoms. Therefore it may be also referred to as a selectivity control agent.

Examples of external donors suitable for use in the present invention are benzoic acid esters, 1,3-diethers, alkylamino-alkoxysilanes, alkyl-alkoxysilane, imidosilanes, and alkylimidosilanes.

The aluminium/external donor molar ratio in the polymerization catalyst system preferably is from 0.1 to 200; more preferably from 1 to 100.

Mixtures of external donors may be present and may include from about 0.1 mol % to about 99.9% mol % of a first external donor and from about 99.9 mol % to about 0.1 mol % of either a second or the additional alkoxysilane external donor disclosed below.

When a silane external donor is used, the Si/Ti molar ratio in the catalyst system can range from 0.1 to 40, preferably from 0.1 to 20, even more preferably from 1 to 20 and most preferably from 2 to 10.

A benzoic acid ester can be used as internal donor. It is a monocarboxylic acid ester as shown in Formula V.

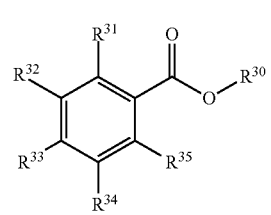

(Formula V)

$R^{30}$ is selected from a hydrocarbyl group independently selected from alkyl, alkenyl, aryl, aralkyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 10 carbon atoms, more preferably from 1 to 8 carbon atoms, even more preferably from 1 to 6 carbon atoms. Suitable examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

$R^{31}$, $R^{32}$, $R^{33}$, $R^{34}$, $R^{35}$ are each independently selected from hydrogen, a heteroatom (preferably a halide), or a hydrocarbyl group, selected from e.g. alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 10 carbon atoms, more preferably from 1 to 8 carbon atoms, even more preferably from 1 to 6 carbon atoms.

Suitable non-limiting examples of "benzoic acid esters" include an alkyl p-alkoxybenzoate (such as ethyl p-methoxybenzoate, methyl p-ethoxybenzoate, ethyl p-ethoxybenzoate), an alkyl benzoate (such as ethyl benzoate, methyl benzoate), an alkyl p-halobenzoate (ethyl p-chlorobenzoate, ethyl p-bromobenzoate), and benzoic anhydride. The benzoic acid ester is preferably selected from ethyl benzoate, benzoyl chloride, ethyl p-bromobenzoate, n-propyl benzoate and benzoic anhydride. The benzoic acid ester is more preferably ethyl benzoate.

In an embodiment the external donor used is ethyl benzoate. In another embodiment, the external donor used is ethyl p-ethoxybenzoate.

As used herein a "di-ether" may be a 1,3-di(hydrocarboxy)propane compound, optionally substituted on the 2-position represented by the Fischer projection of the Formula VII,

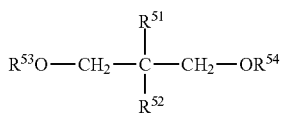

(Formula VII)

R$^{51}$ and R$^{52}$ are each independently selected from a hydrogen or a hydrocarbyl group selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 10 carbon atoms, more preferably from 1 to 8 carbon atoms, even more preferably from 1 to 6 carbon atoms. Suitable examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

R$^{53}$ and R$^{54}$ are each independently selected from hydrogen, a halide or a hydrocarbyl group, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 10 carbon atoms, more preferably from 1 to 8 carbon atoms, even more preferably from 1 to 6 carbon atoms.

Suitable examples of dialkyl diether compounds include 1,3-dimethoxypropane, 1,3-diethoxypropane, 1,3-dibutoxypropane, 1-methoxy-3-ethoxypropane, 1-methoxy-3-butoxypropane, 1-methoxy-3-cyclohexoxypropane, 2,2-dimethyl-1,3-dimethoxypropane, 2,2-diethyl-1,3-dimethoxypropane, 2,2-di-n-butyl-1,3-dimethoxypropane, 2,2-diiso-butyl-1,3-dimethoxypropane, 2-ethyl-2-n-butyl-1,3-dimethoxypropane, 2-n-propyl-2-cyclopentyl-1,3-dimethoxypropane, 2,2-dimethyl-1,3-diethoxypropane, 2-n-propyl-2-cyclohexyl-1,3-diethoxypropane, 2-(2-ethylhexyl)-1,3-dimethoxypropane, 2-isopropyl-1,3-dimethoxypropane, 2-n-butyl-1,3-dimethoxypropane, 2-sec-butyl-1,3-dimethoxypropane, 2-cyclohexyl-1,3-dimethoxypropane, 2-phenyl-1,3-diethoxypropane, 2-cumyl-1,3-diethoxypropane, 2-(2-phenyllethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxypropane, 2,2-di-npropyl-1,3-dimethoxypropane, 2-methyl-2-n-propyl-1,3-dimethoxypropane, 2-methyl-2-benzyl-1,3-dimethoxypropane, 2-methyl-2-ethyl-1,3-dimethoxypropane, 2-methyl-2-phenyl-1,3-dimethoxypropane, 2-methyl-2-cyclohexyl-1,3-dimethoxypropane, 2,2-bis(pchlorophenyl)-1,3-dimethoxypropane, 2,2-bis(2-cyclohexylethyl)-1,3-dimethoxypropane, 2-methyl-2-iso butyl-1,3-dimethoxypropane, 2-methyl-2-(2-ethylhexyl)-1,3-dimethoxy propane, 2-methyl-2-isopropyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-diiso butyl-1,3-diethoxypropane, 2,2-diisobuty 1-1,3-di -n-butoxypropane, 2-iso butyl-2-isopropyl-1,3-dimethoxypropane, 2,2-di-sec-butyl-1,3-dimethoxypropane, 2,2-di-t-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane, 2-isopropyl-2-(3, 7-dimethyloctyl) 1,3-dimethoxypropane, 2,2-diisopropyl-1,3-dimethoxypropane, 2-isopropyl-2-cyclohexylmethyl-1,3-dimethoxypropane, 2,2-diisopentyl-1,3-dimethoxypropane, 2-isopropyl-2-cyclohexyl-1,3-dimethoxypropane, 2-isopropyl-2-cyclopentyl-1,3-dimethoxypropane, 2,2-dicylopentyl-1,3-dimethoxypropane, 2-n-heptyl-2-n-pentyl-1,3-dimethoxypropane, 9,9-bis(methoxymethyl)fluorene, 1,3-dicyclohexyl-2,2-bis(methoxymethyl)propane, 3,3-bis(methoxymethyl)-2,5-dimethylhexane, or any combination of the foregoing. In an embodiment, the internal electron donor is 1,3-dicyclohexyl-2,2-bis(methoxymethyl)propane, 3 ,3-bis(methoxymethyl)-2,5-dimethylhexane, 2,2-dicyclopentyl-1,3-dimethoxypropane and combinations thereof.

Examples of preferred ethers are diethyl ether, such as 2-ethyl-2-butyl-1, 3-dimethoxypropane, 2-isopropyl-2-isopentyl-1,3-dimethoxypropane and 9,9-bis (methoxymethyl) fluorene:

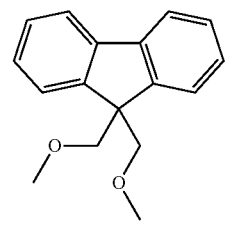 [SMILES: COCC1(COC)c2ccccc2-c2ccccc21]

Documents EP1538167 and EP1783145 disclose a Ziegler-Natta catalyst type comprising an organo-silicon compound as external donor that is represented by the Fischer projection of formula Si(OR$^c$)$_3$(NR$^d$R$^e$), wherein R$^c$ is a hydrocarbon group having 1 to 6 carbon atoms, R$^d$ is a hydrocarbon group having 1 to 12 carbon atoms or hydrogen atom, and Re is a hydrocarbon group having 1 to 12 carbon atoms used as an external electron donor.

An other example of a suitable external donor according to the present invention is a compound according to Formula III:

The R$^{90}$ and R$^{91}$ groups are each independently an alkyl having from 1 to 10 carbon atoms. Said alkyl group may be linear, branched or cyclic. Said alkyl group may be substituted or unsubstituted. Preferably, said hydrocarbyl group has from 1 to 8 carbon atoms, even more preferably from 1 to 6 carbon atoms, even more preferably from 2 to 4 carbon atoms. Preferably, each R$^{90}$ is ethyl. Preferably, each R$^{91}$ is ethyl. A is either a direct bond between nitrogen and silicon or a spacer selected from an alkyl having 1-10 carbon atoms, preferably a direct bond.

An example of such an external donor is diethyl-aminotriethoxysilane (DEATES) wherein A is a direct bond, each R$^{9o}$ is ethyl and each R$^{91}$ is ethyl.

Alkyl-alkoxysilanes according to Formula IV may be used:

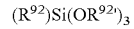        Formula IV

The R$^{92}$ and R$^{92'}$ groups are each independently an alkyl having from 1 to 10 carbon atoms. Said alkyl group may be linear, branched or cyclic. Said alkyl group may be substituted or unsubstituted. Preferably, said hydrocarbyl group has from 1 to 8 carbon atoms, even more preferably from 1 to 6 carbon atoms, even more preferably from 2 to 4 carbon atoms. Preferably, all three $R^{92'}$ groups are the same. Preferably, $R^{92'}$ is methyl or ethyl. Preferably, $R^{92}$ is ethyl or propyl, more preferably n-propyl.

Typical external donors known in the art (for instance as disclosed in documents WO2006/056338A1, EP1 838741 B1, U.S. Pat. No. 6,395,670B1, EP398698A1, WO96/32426A) are organosilicon compounds having general formula $Si(OR^a)_{4-n}R^b{}_n$, wherein n can be from 0 up to 2, and each $R^a$ and $R^b$, independently, represents an alkyl or aryl group, optionally containing one or more hetero atoms for instance O, N, S or P, with, for instance, 1-20 carbon atoms; such as n-propyl trimethoxysilane (nPTMS), n-propyl triethoxysilane (nPEMS), diisobutyl dimethoxysilane (DiBDMS), tert-butyl isopropyl dimethyxysilane (tBiPDMS), cyclohexyl methyldimethoxysilane (CHMDMS), dicyclopentyl dimethoxysilane (DCPDMS) or di(iso-propyl) dimethoxysilane (DiPDMS).

Imidosilanes according to Formula I may be used as external donors.

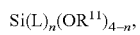  Formula I wherein,

Si is a silicon atom with valency 4+;

O is an oxygen atom with valency 2- and O is bonded to Si via a silicon-oxygen bond;

n is 1, 2, 3 or 4;

$R^{11}$ is selected from the group consisting of linear, branched and cyclic alkyl having at most 20 carbon atoms and aromatic substituted and unsubstituted hydrocarbyl having 6 to 20 carbon atoms; two $R^{11}$ groups can be connected and together may form a cyclic structure; and L is a group represented by the Fischer projection of Formula I"

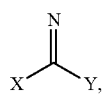  (Formula I")

wherein,

L is bonded to the silicon atom via a nitrogen-silicon bond;

L has a single substituent on the nitrogen atom, where this single substituent is an imine carbon atom; and X and Y are each independently selected from the group consisting of:

a) a hydrogen atom;

b) a group comprising a heteroatom selected from group 13, 14, 15, 16 or 17 of the IUPAC Periodic Table of the Elements, through which X and Y are each independently bonded to the imine carbon atom of Formula II, wherein the heteroatom is substituted with a group consisting of a linear, branched and cyclic alkyl having at most 20 carbon atoms, optionally containing a heteroatom selected from group 13, 14, 15, 16 or 17 of the IUPAC Periodic Table of the Elements; and/or with an aromatic substituted and unsubstituted hydrocarbyl having 6 to 20 carbon atoms, optionally containing a heteroatom selected from group 13, 14, 15, 16 or 17 of the IUPAC Periodic Table of the Elements;

c) a linear, branched and cyclic alkyl having at most 20 carbon atoms, optionally containing a heteroatom selected from group 13, 14, 15, 16 or 17 of the IUPAC Periodic Table of the Elements; and d) an aromatic substituted and unsubstituted hydrocarbyl having 6 to 20 carbon atoms, optionally containing a heteroatom selected from group 13, 14, 15, 16 or 17 of the IUPAC.

$R^{11}$ is selected from the group consisting of linear, branched and cyclic alkyl having at most 20 carbon atoms.

Preferably, $R^{11}$ is a selected from the group consisting of linear, branched and cyclic alkyl having at most 20 carbon atoms, preferably 1 to 10 carbon atoms or 3 to 10 carbon atoms, more preferably 1 to 6 carbon atoms.

Suitable examples of $R^{11}$ include methyl, ethyl, n-propyl, iso-propyl, n-butyl, iso-butyl, tert-butyl, sec-butyl, iso-butyl, n-pentyl, iso-pentyl, cyclopentyl, n-hexyl and cyclohexyl. More preferably, $R^{11}$ is a linear alkyl having 1 to 10, even more preferably 1 to 6 carbon atoms. Most preferably, $R^{11}$ is methyl or ethyl.

$R^{12}$ is selected from the group consisting of a linear, branched and cyclic hydrocarbyl group independently selected from alkyl, alkenyl, aryl, aralkyl, alkoxycarbonyl or alkylaryl groups, and one or more combinations thereof. Said hydrocarbyl group may be substituted or unsubstituted. Said hydrocarbyl group may contain one or more heteroatoms. Preferably, said hydrocarbyl group has from 1 to 20 carbon atoms.

Suitable examples of $R^{12}$ include methyl, ethyl, n-propyl, iso-propyl, n-butyl, iso-butyl, tert-butyl, sec-butyl, iso-butyl, n-pentyl, iso-pentyl, cyclopentyl, n-hexyl, cyclohexyl, unsubstituted or substituted phenyl.

Specific examples are the following compounds: 1,1,1-triethoxy-N-(2,2,4,4-tetramethylpentan-3-ylidene) silanamine (all $R^{11}$ groups are=ethyl and X and Y are both tert-butyl); 1,1,1-trimethoxy-N-(2,2,4,4-tetramethylpentan-3-ylidene) silanamine (all $R^{11}$ groups are methyl, and X and Y are tert butyl), N,N,N',N'-tetramethylguanidine triethoxysilane (all R11 groups are ethyl, both X and Y are dimethylamino). Alkylimidosilanes according to Formula I' may be used as external donors.

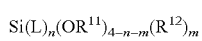  Formula I' wherein,

Si is a silicon atom with valency 4+;

O is an oxygen atom with valency 2- and O is bonded to Si via a silicon-oxygen bond;

n is 1, 2, 3 or 4;

m is 0,1 or 2 n+m≤4

$R^{11}$ is selected from the group consisting of linear, branched and cyclic alkyl having at most 20 carbon atoms and aromatic substituted and unsubstituted hydrocarbyl having 6 to 20 carbon atoms; and $R^{12}$ is selected from the group consisting of linear, branched and cyclic alkyl having at most 20 carbon atoms and aromatic substituted and unsubstituted hydrocarbyl having 6 to 20 carbon atoms;

L is a group represented by the Fischer projection of Formula I"

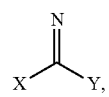  (Formula I")

wherein,

L is bonded to the silicon atom via a nitrogen-silicon bond;

L has a single substituent on the nitrogen atom, where this single substituent is an imine carbon atom; and X and Y are each independently selected from the group consisting of:
a) a hydrogen atom;
b) a group comprising a heteroatom selected from group 13, 14, 15, 16 or 17 of the IUPAC Periodic Table of the Elements, through which X and Y are each independently bonded to the imine carbon atom of Formula II, wherein the heteroatom is substituted with a group consisting of a linear, branched and cyclic alkyl having at most 20 carbon atoms, optionally containing a heteroatom selected from group 13, 14, 15, 16 or 17 of the IUPAC Periodic Table of the Elements; and/or with an aromatic substituted and unsubstituted hydrocarbyl having 6 to 20 carbon atoms, optionally containing a heteroatom selected from group 13, 14, 15, 16 or 17 of the IUPAC Periodic Table of the Elements;
c) a linear, branched and cyclic alkyl having at most 20 carbon atoms, optionally containing a heteroatom selected from group 13, 14, 15, 16 or 17 of the IUPAC Periodic Table of the Elements; and
d) an aromatic substituted and unsubstituted hydrocarbyl having 6 to 20 carbon atoms, optionally containing a heteroatom selected from group 13, 14, 15, 16 or 17 of the IUPAC Periodic Table of the Elements.

$R^{11}$ and R12 are as discussed above.

In a first specific example, the external donor may have a structure corresponding to Formula I' wherein n=1, m=2, X=Y=phenyl, both $R^{12}$ groups are methyl, and $R^{11}$ is butyl.

In a second specific example, the external donor may have a structure corresponding to Formula I' wherein n=4, m=0, X=methyl, and Y=ethyl.

In a third specific example, the external donor may have a structure corresponding to Formula I' wherein n=1, m=1, X=phenyl, Y=—CH$_2$—Si(CH$_3$)$_3$, and $R^{12}$=$R^{11}$=methyl.

In a fourth specific example, the external donor may have a structure corresponding to Formula I' wherein n=1, m=1, X=—NH—C=NH(NH$_2$)—, Y=—NH—(CH$_2$)$_3$—Si(OCH$_2$CH$_3$)$_3$, and $R^{12}$=—(CH$_2$)$_3$—NH$_2$; $R^{11}$=ethyl.

The additional compound(s) in the external donor according to the invention may be one or more alkoxysilanes. The alkoxysilane compound can have any of the structures disclosed herein. The alkoxysilane is described by Formula IX

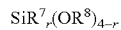  (Formula IX)

$R^7$ is independently a hydrocarbyl, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 6 to 12 carbon atoms, even more preferably from 3 to 12 carbon atoms. For example, $R^7$ may be C6-12 aryl, alkyl or aralkyl, C3-12 cycloalkyl, C3-12 branched alkyl, or C3-12 cyclic or acyclic amino group. The value for r is selected from 1 or 2.

For the formula SiNR$^7$r(OR$^8$)$_{4-r}$,$R^7$ may also be hydrogen.

$R^8$ is independently selected from a hydrogen or a hydrocarbyl, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 12 carbon atoms, even more preferably from 1 to 6 carbon atoms. For example, $R^8$ may be C1-4 alkyl, preferably methyl or ethyl Non-limiting examples of suitable silane-compounds include tetramethoxysilane (TMOS or tetramethyl orthosilicate), tetraethoxysilane (TEOS or tetraethyl orthosilicate), methyl trimethoxysilane, methyl triethoxysilane, methyl tripropoxysilane, methyl tributoxysilane, ethyl trimethoxysilane, ethyl triethoxysilane, ethyl tripropoxysilane, ethyl tributoxysilane, n-propyl trimethoxysilane, n-propyl triethoxysilane, n-propyl tripropoxysilane, n-propyl tributoxysilane, isopropyl trimethoxysilane, isopropyl triethoxysilane, isopropyl tripropoxysilane, isopropyl tributoxysilane, phenyl trimethoxysilane, phenyl triethoxysilane, phenyl tripropoxysilane, phenyl tributoxysilane, cyclopentyl trimethoxysilane, cyclopentyl triethoxysilane, diethylamino triethoxysilane, dimethyl dimethoxysilane, dimethyl diethoxysilane, dimethyl dipropoxysilane, dimethyl dibutoxysilane, diethyl dimethoxysilane, diethyl diethoxysilane, diethyl dipropoxysilane, diethyl dibutoxysilane, di-n-propyl dimethoxysilane, d-n-propyl diethoxysilane, di-n-propyl dipropoxysilane, di-n-propyl dibutoxysilane, diisopropyl dimethoxysilane, diisopropyl diethoxysilane, diisopropyl dipropoxysilane, diisopropyl dibutoxysilane, diphenyl dimethoxysilane, diphenyl diethoxysilane, diphenyl dipropoxysilane, diphenyl dibutoxysilane, dicyclopentyl dimethoxysilane, dicyclopentyl diethoxysilane, diethyl diphenoxysilane, di-tert-butyl dimethoxysilane, methyl cyclohexyl dimethoxysilane, ethyl cyclohexyl dimethoxysilane, isobutyl isopropyl dimethoxysilane, tert-butyl isopropyl dimethoxysilane, trifluoropropyl methyl dimethoxysilane, bis(perhydroisoquinolino) dimethoxysilane, dicyclohexyl dimethoxysilane, dinorbornyl dimethoxysilane, cyclopentyl pyrrolidino dimethoxysilane and bis(pyrrolidino) dimethoxysilane.

In an embodiment, the silane-compound for the additional external donor is dicyclopentyl dimethoxysilane, di-isopropyl dimethoxysilane, di-isobutyl dimethyoxysilane, methylcyclohexyl dimethoxysilane, n-propyl trimethoxysilane, n-propyltriethoxysilane, dimethylamino triethoxysilane, and one or more combinations thereof.

The invention also relates to a process to make the catalyst system by contacting a Ziegler-Natta type procatalyst, a co-catalyst and an external electron donor. The procatalyst, the cocatalyst and the external donor can be contacted in any way known to the skilled person in the art; and as also described herein, more specifically as in the Examples.

The invention further relates to a process for making a polyolefin by contacting an olefin with the catalyst system according to the present invention. The procatalyst, the cocatalyst, the external donor and the olefin can be contacted in any way known to the skilled person in the art; and as also described herein.

For instance, the external donor in the catalyst system according to the present invention can be complexed with the co-catalyst and mixed with the procatalyst (pre-mix) prior to contact between the procatalyst and the olefin. The external donor can also be added independently to the polymerization reactor. The procatalyst, the co-catalyst, and the external donor can be mixed or otherwise combined prior to addition to the polymerization reactor.

Contacting the olefin with the catalyst system according to the present invention can be done under standard polymerization conditions, known to the skilled person in the art. See for example Pasquini, N. (ed.) "Polypropylene handbook" $2^{nd}$ edition, Carl Hanser Verlag Munich, 2005. Chapter 6.2 and references cited therein.

The polymerization process may be a gas phase, a slurry or a bulk polymerization process, operating in one or more than one reactor. One or more olefin monomers can be introduced in a polymerization reactor to react with the procatalyst and to form an olefin-based polymer (or a fluidized bed of polymer particles).

In the case of polymerization in a slurry (liquid phase), a dispersing agent is present. Suitable dispersing agents include for example propane, n-butane, isobutane, n-pentane, isopentane, hexane (e.g. iso-or n-), heptane (e.g. iso-or n-), octane, cyclohexane, benzene, toluene, xylene, liquid propylene and/or mixtures thereof. The polymerization such as for example the polymerization temperature and time, monomer pressure, avoidance of contamination of catalyst, choice of polymerization medium in slurry processes, the use of further ingredients (like hydrogen) to control polymer molar mass, and other conditions are well known to persons of skill in the art. The polymerization temperature may vary within wide limits and is, for example for propylene polymerization, from 0° C. to 120° C., preferably from 40° C. to 100° C. The pressure during (propylene) (co)polymerization is for instance from 0.1 to 6 MPa, preferably from 1 to 4 MPa.

Several types of polyolefins are prepared such as homopolyolefins, random copolymers and heterophasic polyolefin. The for latter, and especially heterophasic polypropylene, the following is observed.

Heterophasic propylene copolymers are generally prepared in one or more reactors, by polymerization of propylene and optionally one or more other olefins, for example ethylene, in the presence of a catalyst and subsequent polymerization of a propylene-α-olefin mixture. The resulting polymeric materials can show multiplpe phases (depending on monomer ratio), but the specific morphology usually depends on the preparation method and monomer ratio. The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; Polypropylene and other Polyolefins, by Ser van der Ven, Studies in Polymer Science 7, Elsevier 1990; WO06/010414, U.S. Pat. Nos. 4,399,054 and 4,472,524.

The molar mass of the polyolefin obtained during the polymerization can be controlled by adding hydrogen or any other agent known to be suitable for the purpose during the polymerization. The polymerization can be carried out in a continuous mode or batch-wise. Slurry-, bulk-, and gas-phase polymerization processes, multistage processes of each of these types of polymerization processes, or combinations of the different types of polymerization processes in a multistage process are contemplated herein. Preferably, the polymerization process is a single stage gas phase process or a multistage, for instance a two-stage gas phase process, e.g. wherein in each stage a gas-phase process is used or including a separate (small) prepolymerization reactor.

Examples of gas-phase polymerization processes include both stirred bed reactors and fluidized bed reactor systems; such processes are well known in the art. Typical gas phase olefin polymerization reactor systems typically comprise a reactor vessel to which an olefin monomer(s) and a catalyst system can be added and which contain an agitated bed of growing polymer particles. Preferably, the polymerization process is a single stage gas phase process or a multistage, for instance a 2-stage, gas phase process wherein in each stage a gas-phase process is used.

As used herein, "gas phase polymerization" is the way of an ascending fluidizing medium, the fluidizing medium containing one or more monomers, in the presence of a catalyst through a fluidized bed of polymer particles maintained in a fluidized state by the fluidizing medium optionally assisted by mechanical agitation. Examples of gas phase polymerization are fluid bed, horizontal stirred bed and vertical stirred bed.

"fluid-bed," "fluidized," or "fluidizing" is a gas-solid contacting process in which a bed of finely divided polymer particles is elevated and agitated by a rising stream of gas optionally assisted by mechanical stirring. In a "stirred bed" upwards gas velocity is lower than the fluidization threshold.

A typical gas-phase polymerization reactor (or gas phase reactor) include a vessel (i.e., the reactor), the fluidized bed, a product discharge system and may include a mechanical stirrer, a distribution plate, inlet and outlet piping, a compressor, a cycle gas cooler or heat exchanger. The vessel may include a reaction zone and may include a velocity reduction zone, which is located above the reaction zone (viz. bed). The fluidizing medium may include propylene gas and at least one other gas such as an olefin and/or a carrier gas such as hydrogen or nitrogen. The contacting can occur by way of feeding the procatalyst into the polymerization reactor and introducing the olefin into the polymerization reactor. In an embodiment, the process includes contacting the olefin with a co-catalyst. The co-catalyst can be mixed with the procatalyst (pre-mix) prior to the introduction of the procatalyst into the polymerization reactor. The co-catalyst may be also added to the polymerization reactor independently of the procatalyst. The independent introduction of the co-catalyst into the polymerization reactor can occur (substantially) simultaneously with the procatalyst feed. An external donor may also be present during the polymerization process.

The olefin according to the invention may be selected from mono- and di-olefins containing from 2 to 40 carbon atoms. Suitable olefin monomers include alpha-olefins, such as ethylene, propylene, alpha-olefins having from 4 to 20 carbon atoms (viz. C4-20), such as 1-butene, 1-pentene, 1-hexene, 4-methyl-1-pentene, 1-heptene, 1-octene, 1-decene, 1-dodecene and the like; C4-C20 diolefins, such as 1,3-butadiene, 1,3-pentadiene, norbornadiene, 5-vinyl-2-norbornene (VNB), 1,4-hexadiene, 5-ethylidene-2-norbornene (ENB) and dicyclopentadiene; vinyl aromatic compounds having from 8 to 40 carbon atoms (viz. C8-C40) including styrene, o-, m- and p-methylstyrene, divinylbenzene, vinylbiphenyl, vinylnapthalene; and halogen-substituted C8-C40 vinyl aromatic compounds such as chlorostyrene and fluorostyrene.

Preferably, the olefin is propylene or a mixture of propylene and ethylene, to result in a propylene-based polymer, such as propylene homopolymer or propylene-olefin copolymer. The olefin may an alpha-olefin having up to 10 carbon atoms, such as ethylene, butane, hexane, heptane, octene. A propylene copolymer is herein meant to include both so-called random copolymers which typically have relatively low comonomer content, e.g. up to 10 mol %, as well as so-called impact PP copolymers or heterophasic PP copolymers comprising higher comonomer contents, e.g. from 5 to 80 mol %, more typically from 10 to 60 mol %. The impact PP copolymers are actually blends of different propylene polymers; such copolymers can be made in one or two reactors and can be blends of a first component of low comonomer content and high crystallinity, and a second component of high comonomer content having low crystallinity or even rubbery properties. Such random and impact copolymers are well-known to the skilled in the art. A propylene-ethylene random copolymer may be produced in one reactor. Impact PP copolymers may be produced in two reactors: polypropylene homopolymer may be produced in a first reactor; the content of the first reactor is subsequently transferred to a second reactor into which ethylene (and optionally propylene) is introduced. This results in production of a propylene-ethylene copolymer (i.e. an impact copolymer) in the second reactor.

The present invention also relates to a polyolefin, preferably a polypropylene obtained or obtainable by a process, comprising contacting an olefin, preferably propylene or a mixture of propylene and ethylene with the procatalyst according to the present invention. The terms polypropylene and propylene-based polymer are used herein interchangeable. The polypropylene may be a propylene homopolymer or a mixture of propylene and ethylene, such as a propylene-based copolymer, e.g. heterophasic propylene-olefin copolymer; random propylene-olefin copolymer, preferably the olefin in the propylene-based copolymers being a C2, or C4-C6 olefin, such as ethylene, butylene, pentene or hexene. Such propylene-based (co)polymers are known to the skilled person in the art; they are also described herein above.

The present invention also relates to a polyolefin, preferably a propylene-based polymer obtained or obtainable by a process as described herein above, comprising contacting propylene or a mixture of propylene and ethylene with a catalyst system according to the present invention.

In one embodiment the present invention relates to the production of a homopolymer of polypropylene.

Several polymer properties are discussed here.

Xylene soluble fraction (XS) is preferably from about 0.5 wt % to about 10 wt %, or from about 1 wt % to about 8 wt %, or from 2 to 6 wt %, or from about 1 wt % to about 5 wt %. Preferably, the xylene amount (XS) is lower than 7 wt %, preferably lower than 6 wt %, more preferably lower than 5 wt % or even lower than 4 wt % and most preferably lower than 3 wt %.

The production rate is preferably from about 1 kg/g/hr to about 100 kg/g/hr, or from about 5 kg/g/hr to about 20 kg/g/hr.

MFR is preferably from about 0.01 g/10 min to about 2000 g/10 min, or from about 0.01 g/10 min to about 1000 g/10 min; or from about 0.1 g/10 min to about 500 g/10 min, or from about 0.5 g/10 min to about 150 g/10 min, or from about 1 g/10 min to about 100 g/10 min.

The olefin polymer obtained in the present invention is considered to be a thermoplastic polymer. The thermoplastic polymer composition according to the invention may also contain one or more of usual additives, like those mentioned above, including stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; impact modifiers; blowing agents; fillers and reinforcing agents; and/or components that enhance interfacial bonding between polymer and filler, such as a maleated polypropylene, in case the thermoplastic polymer is a polypropylene composition. The skilled person can readily select any suitable combination of additives and additive amounts without undue experimentation.

The amount of additives depends on their type and function; typically is of from 0 to about 30 wt %; preferably of from 0 to about 20 wt %; more preferably of from 0 to about 10 wt % and most preferably of from 0 to about 5 wt % based on the total composition. The sum of all components added in a process to form the polyolefins, preferably the propylene-base polymers or compositions thereof should add up to 100 wt %.

The thermoplastic polymer composition of the invention may be obtained by mixing one or more of the thermoplastic polymers with one or more additives by using any suitable means. Preferably, the thermoplastic polymer composition of the invention is made in a form that allows easy processing into a shaped article in a subsequent step, like in pellet or granular form. The composition can be a mixture of different particles or pellets; like a blend of a thermoplastic polymer and a master batch of nucleating agent composition, or a blend of pellets of a thermoplastic polymer comprising one of the two nucleating agents and a particulate comprising the other nucleating agent, possibly pellets of a thermoplastic polymer comprising said other nucleating agent. Preferably, the thermoplastic polymer composition of the invention is in pellet or granular form as obtained by mixing all components in an apparatus like an extruder; the advantage being a composition with homogeneous and well-defined concentrations of the nucleating agents (and other components).

The invention also relates to the use of the polyolefins, preferably the propylene-based polymers (also called polypropylenes) according to the invention in injection moulding, blow moulding, extrusion moulding, compression moulding, casting, thin-walled injection moulding, etc. for example in food contact applications.

Furthermore, the invention relates to a shaped article comprising the polyolefin, preferably the propylene-based polymer according to the present invention.

The polyolefin, preferably the propylene-based polymer according to the present invention may be transformed into shaped (semi)-finished articles using a variety of processing techniques. Examples of suitable processing techniques include injection moulding, injection compression moulding, thin wall injection moulding, extrusion, and extrusion compression moulding. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging applications both for food and non-food segments. This includes pails and containers and yellow fats/margarine tubs and dairy cups.

It is noted that the invention relates to all possible combinations of features recited in the claims. Features described in the description may further be combined.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

EXAMPLES

Example A

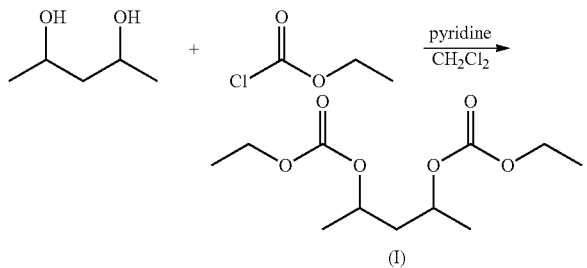

In a reaction vessel 2,4-pentandiol (10 gram) was added to a mixture of pyridine (17 ml) and methylene dichloride (150 ml). The mixture was cooled to 10° C. and ethyl chloroformate (28 gram) was added drop wise. The mixture was further stirred overnight at 25° C. The completion of reaction was monitored using gas chromatography. Then, an ammonium chloride solution was added to the reaction mixture and phase separation into an organic phase and an aqueous phase was allowed. The organic layer is separated and obtained, washed with water, dried on anhydrous sodium sulfate and distilled to give 22 gram of a crude product. The crude product was further purified by high vacuum distillation to give 17.5 gram (74%) of diethyl pentane-2,4-diyl dicarbonate (I). The product was characterized by: $^1$H NMR(300 MHz CDCl$_3$) δ=1.29 (d, 6H); 1.37 (d, 6H); 1.8 (m, 8H); 4.13 (m, 2H); 4.8 (m, 4H) (isomeric mixture). $^{13}$C NMR: δ=14.167, 20.029, 20.326, 41.726, 42.322, 63.599, 71.056, 71.041, 71.811, 154.534, 154.580 (isomeric mixture). m/z 249.2 (m+1).

Example B

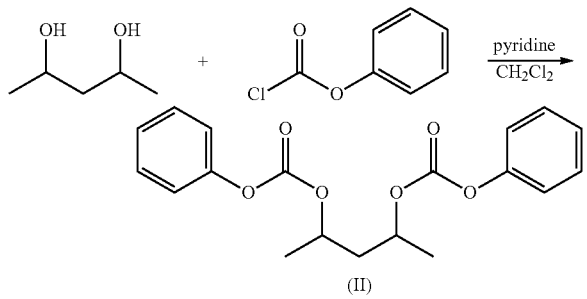

In a reaction vessel 2,4-pentandiol (10 gram) was added to a mixture of pyridine (17 ml) and methylene dichloride (150 ml). The mixture was cooled to 10° C. and phenyl chloroformate (32 gram) was added drop wise. The mixture was further stirred overnight at 25° C. The completion of reaction was monitored using Gas chromatography. Then, an ammonium chloride solution was added to the reaction mixture and phase separation into an organic phase and an aqueous phase was allowed. The organic layer is separated and obtained, washed with water, dried on anhydrous sodium sulfate and distilled to give 34 gram of a crude product. The crude product was further purified by high vacuum distillation to give 23.8 gram (70%) of pentane-2,4-diyl diphenyl dicarbonate (II). The product was characterized by: $^1$H NMR(300 MHz CDCl$_3$) δ=1.37 (d, 2×CH$_3$);); 1.77 (d, —CH2); 4.13 (m, 2×CH); 7.29-7.42 (m, ArH) (isomeric mixture).

Comparative Example C

Preparation of 4-[Benzoyl (Methyl)Amino]Pentan-2-yl Benzoate]

This compound is prepared as disclosed in the Examples WO2014001257.

Example 1

Step A) butyl Grignard Formation Step
This step was carried out as disclosed in Example 1.A of WO2014/001257A1.

Step B) Preparation of the First Intermediate Reaction Product
This step was carried out as described in Example XX of EP 1 222 214 B1, except that the dosing temperature of the reactor was 35° C., the dosing time was 360 min and the propeller stirrer was used. 250 ml of dibutyl ether was introduced to a 1 liter reactor. The reactor was fitted by propeller stirrer and two baffles. The reactor was thermostated at 35° C.

The solution of reaction product of step A (360 ml, 0.468 mol Mg) and 180 ml of a solution of tetraethoxysilane (TES) in dibutyl ether (DBE), (55 ml of TES and 125 ml of DBE), were cooled to 10° C., and then were dosed simultaneously to a mixing device of 0.45 ml volume supplied with a stirrer and jacket. Dosing time was 360 min. Thereafter the pre-mixed reaction product A and the TES-solution were introduced to a reactor. The mixing device (mini-mixer) was cooled to 10° C. by means of cold water circulating in the mini-mixer's jacket. The stirring speed in the mini-mixer was 1000 rpm. The stirring speed in reactor was 350 rpm at the beginning of dosing and was gradually increased up to 600 rpm at the end of dosing stage. On the dosing completion the reaction mixture was heated up to 60° C. and kept at this temperature for 1 hour. Then the stirring was stopped and the solid substance was allowed to settle. The supernatant was removed by decanting. The solid substance was washed three times using 500 ml of heptane. As a result, a pale yellow solid substance, reaction product B (the solid first intermediate reaction product; the support), was obtained, suspended in 200 ml of heptane. The average particle size of support was 22 μm and span value $(d_{90}-d_{10})/d_{50}=0.5$.

Step C) Preparation of the Second Intermediate Reaction Product

Support activation was carried out as described in Example IV of WO/2007/134851 to obtain the second intermediate reaction product.

In inert nitrogen atmosphere at 20° C. a 250 ml glass flask equipped with a mechanical agitator is filled with slurry of 5 g of reaction product of step B dispersed in 60 ml of heptane. Subsequently a solution of 0.22 ml ethanol (EtOH/Mg=0.1) in 20 ml heptane is dosed under stirring during 1 hour. After keeping the reaction mixture at 20° C. for 30 minutes, a solution of 0.79 ml titanium tetraethoxide (TET/Mg=0.1) in 20 ml of heptane was added for 1 hour. The slurry was slowly allowed to warm up to 30° C. for 90 min and kept at that temperature for another 2 hours. Finally the supernatant liquid is decanted from the solid reaction product (the second intermediate reaction product; activated support) which was washed once with 90 ml of heptane at 30° C.

Step D) Preparation of the Catalyst Component

A reactor was brought under nitrogen and 125 ml of titanium tetrachloride was added to it. The reactor was heated to 100° C. and a suspension, containing about 5.5 g of activated support (step C) in 15 ml of heptane, was added to it under stirring. Then the temperature of reaction mixture was increased to 110° C. for 10 min and 1.47 g the internal donor prepared in Example A in a ID/Mg molar ratio of 0.15 in 3 ml of chlorobenzene was added to reactor and the reaction mixture was kept at 115° C. for 105 min. Then the stirring was stopped and the solid substance was allowed to settle. The supernatant was removed by decanting, after which the solid product was washed with chlorobenzene (125 ml) at 100° C. for 20 min. Then the washing solution was removed by decanting, after which a mixture of titanium tetrachloride (62.5 ml) and chlorobenzene (62.5 ml) was added. The reaction mixture was kept at 115° C. for 30 min, after which the solid substance was allowed to settle. The supernatant was removed by decanting, and the last treatment was repeated once again. The solid substance obtained was washed five times using 150 ml of heptane at 60° C., after which the catalyst component, suspended in heptane, was obtained.

Step E) Polymerization of Propylene

Polymerization of propylene was carried out in a stainless steel reactor (with a volume of 0.7 l) in heptane (300 ml) at a temperature of 70° C., total pressure 0.7 MPa and hydrogen presence (55 ml) for 1 hour in the presence of a catalyst system comprising the catalyst component according to step D, triethylaluminium as co-catalyst and n-propyltrimethoxysilane as external donor. The concentration of the catalyst component was 0.033 g/l; the concentration of triethylaluminium was 4.0 mmol/l; the concentration of n-propyltrimethoxysilane was 0.2 mmol/l.

Example 2

Example 2 was carried out in the same way as Example 1, but the preparation of the catalyst component in step D was performed as follows.

Step D) Preparation of the Catalyst Component

A reactor was brought under nitrogen and 125 ml of titanium tetrachloride was added to it. The reactor was heated to 90° C. and a suspension, containing about 5.5 g of activated support in 15 ml of heptane, was added to it under stirring. The reaction mixture was kept at 90° C. for 10 min. Then add 0.866 g of ethyl acetate (EA/Mg=0.25 mol). The reaction mixture was kept for 60 min (stage I of procatalyst preparation). Then the stirring was stopped and the solid substance was allowed to settle. The supernatant was removed by decanting, after which the solid product was washed with chlorobenzene (125 ml) at 100° C. for 20 min. Then the washing solution was removed by decanting, after which a mixture of titanium tetrachloride (62.5 ml) and chlorobenzene (62.5 ml) was added. The temperature of reaction mixture was increased to 115° C. and 0.49 g of the internal donor obtained in Example A (ID/Mg=0.05 mol) in 2 ml of chlorobenzene was added to reactor.

Then the reaction mixture was kept at 115° C. for 30 min (stage II of procatalyst preparation). After which the stirring was stopped and the solid substance was allowed to settle. The supernatant was removed by decanting, after which a mixture of titanium tetrachloride (62.5 ml) and chlorobenzene (62.5 ml) was added. The reaction mixture was kept at 115° C. for 30 min (stage III of procatalyst preparation), after which the solid substance was allowed to settle. The supernatant was removed by decanting and the solid was washed five times using 150 ml of heptane at 60° C., after which the catalyst component, suspended in heptane, was obtained.

Example 3

Example 3 was carried out in the same way as Example 2, but the internal donor according to Example B was used in an amount of 0.68 gram (0.05 mol/mol ID/Mg).

Example 4

Example 4 was carried out in the same way as Example 2, but the internal donor according to Example B was used in an amount of 1.36 gram (0.1 mol/mol ID/Mg).

Example 5

Example 5 is a comparative example that was carried out in the same way as disclosed in Example 1 of WO 2014/001257. Data on the catalyst performance at the propylene polymerization are presented in Table 1.

TABLE 1

| Ex. | ID | ID/Mg | ME | ME Wt. % | ID Wt. % | Ti Wt. % | PP Yield Kg/g cat | APP Wt. % | XS % | MFR g/10 min | Mw/Mn |
|---|---|---|---|---|---|---|---|---|---|---|---|
| 1 | Ex. A | 0.15 | — | — | 1.1 | 4.5 | 8.5 | 9.3 | 11.0 | 17.8 | 4.4 |
| 2 | Ex. A | 0.05 | EA | 1.0 | 2.4 | 3.5 | 9.3 | 2.9 | 7.0 | 20.5 | 5.0 |
| 3 | Ex. B | 0.05 | EA | 0.7 | 2.5 | 3.0 | 4.3 | 7.1 | 13.7 | 13.3 | 4.6 |
| 4 | Ex. B | 0.1 | EA | 0.5 | 6.8 | 2.9 | 5.5 | 6.6 | 13.5 | 8.4 | 4.6 |
| 5 | Comp. C | 0.15 | — | — | 17.9 | 2.4 | 4.4 | 0.9 | 2.5 | 0.6 | 7.7 |

Abbreviations and measuring methods:
ID/Mg is the molar ratio of the internal donor (ID) over magnesium
ME wt. % is the amount of monoester in wt. % based on the total amount of the catalyst composition
ID wt. % is the amount of internal donor in wt. % based on the total amount of the procatalyst composition
Ti wt. % is the amount of titanium in wt. % based on the total amount of the procatalyst composition
PP yield, in kg/g cat is the amount of polypropylene obtained per gram of procatalyst.
APP, wt % is the weight percentage of atactic polypropylene. Atactic PP is the PP fraction soluble in heptane during polymerization. APP was determined as follows: 100 ml of the filtrate (y ml) obtained in separating the polypropylene powder (x g) and the heptane was dried over a steam bath and then under vacuum at 60° C. That yielded z g of atactic PP. The total amount of Atactic PP (q g) is: (y/100)*z. The weight percentage of Atactic PP is: (q/(q+x))*100%.

XS, wt % is xylene solubles, measured according to ASTM D 5492-10.

MFR is the melt flow rate as measured at 230° C. with 2.16 kg load, measured according to ISO 1133:2005.

Mw/Mn: Polymer molecular weight and its distribution (MWD) were determined by Waters 150° C. gel permeation chromatograph combined with a Viscotek 100 differential viscosimeter. The chromatograms were run at 140° C. using 1,2,4-trichlorobenzene as a solvent with a flow rate of 1 ml/min. The refractive index detector was used to collect the signal for molecular weights.

$^1$H-NMR and $^{13}$C-NMR spectra were recorded on a Varian Mercury-300 MHz NMR Spectrometer, using deuterated chloroform as a solvent.

From the Examples above it is clear that using a internal donor according to the present invention will lead to polyolefins having a moderate MWD and a high hydrogen sensitivity.

When comparing the internal donor according to Example A and B, the following is observed. When using the internal donor according to Example A (ethyl as $R^{93}$), the activity is noticeably higher, the APP and XS are less and the MFR is higher Hence one or more of the objections of the present invention are obtained by using an internal donor according to Formula A.

The invention claimed is:

1. A procatalyst for polymerization of olefins, which comprises the compound represented by Formula A, as an internal electron donor,

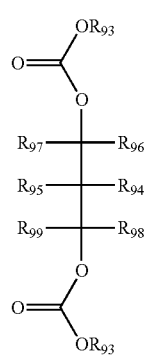

Formula A wherein: $R_{94}$, $R_{95}$, $R_{96}$, $R_{97}$, $R_{98}$, and $R_{99}$ are each independently selected from hydrogen or a linear, branched or cyclic hydrocarbyl group selected from alkyl, alkenyl, aryl, aralkyl, or alkylaryl groups, and one or more combinations thereof;

each $R_{93}$ group is independently aryl having 6 to 20 carbon atoms.

2. The procatalyst according to claim 1, wherein $R_{94}$, $R_{95}$, $R_{96}$, $R_{97}$, $R_{98}$, and $R_{99}$ are independently selected from a group consisting of hydrogen, $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group.

3. A procatalyst for polymerization of olefins, which comprises the compound represented by Formula A, as an internal electron donor,

Formula A wherein $R_{94}$ and $R_{95}$ is each a hydrogen atom and $R_{96}$, $R_{97}$, $R_{98}$, and $R_{99}$ are independently selected from a group consisting of $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group; and each $R_{93}$ group is independently a linear, branched or cyclic hydrocarbyl group selected from alkyl, alkenyl, aryl, aralkyl, or alkylaryl groups, and one or more combinations thereof.

4. The procatalyst according to claim 1, wherein $R_{94}$ and $R_{95}$ is each a hydrogen atom, and when one of $R_{96}$ and $R_{97}$ and one of $R_{98}$ and $R_{99}$ has at least one carbon atom, then the other one of $R_{96}$ and $R_{97}$ and of $R_{98}$ and $R_{99}$ is each a hydrogen atom.

5. The procatalyst according to claim 1, wherein each of the $R_{93}$ has 6 to 12 carbon atoms.

6. A procatalyst for polymerization of olefins, which comprises an internal electron donor, wherein the internal electron donor is pentane-2,4-diyl diphenyl dicarbonate:

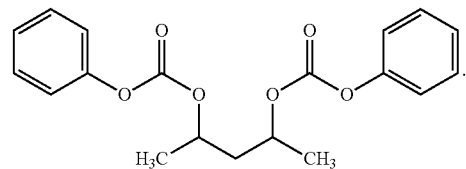 [SMILES: CC(CC(C)OC(=O)Oc1ccccc1)OC(=O)Oc1ccccc1]

7. A process for preparing the procatalyst according to claim 1, comprising contacting a magnesium-containing support with a halogen-containing titanium compound and an internal electron donor, wherein the internal electron donor is represented by Formula A,

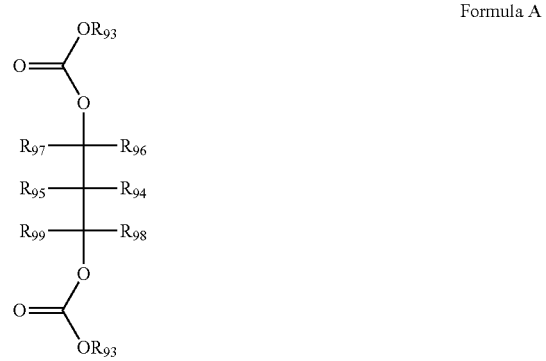

Formula A wherein: $R_{94}$, $R_{95}$, $R_{96}$, $R_{97}$, $R_{98}$, and $R_{99}$ are each independently selected from hydrogen or a linear, branched or cyclic hydrocarbyl group selected from alkyl, alkenyl, aryl, aralkyl, or alkylaryl groups, and one or more combinations thereof;

each $R_{93}$ group is independently aryl having 6 to 20 carbon atoms.

8. The process according to claim 7, which comprises the steps of:
 i) contacting a compound $R^4{}_z MgX^4{}_{2-z}$ with an alkoxy- or aryloxy-containing silane compound to give a first intermediate reaction product, being a solid $Mg(OR^1)_x X^1{}_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof, wherein said hydrocarbyl group may be substituted or unsubstituted, may contain one or more heteroatoms; $X^4$ and $X^1$ are each independently selected from the group of consisting of fluoride (F—), chloride (Cl—), bromide (Br—) or iodide (I—); z is in a range of larger than 0 and smaller than 2, being $0<z<2$;
 ii) optionally contacting the solid $Mg(OR^1)_x X^1{}_{2-x}$ obtained in step ii) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate product; wherein: $M^1$ is a metal selected from the group consisting of Ti, Zr, Hf, Al or Si; v is the valency of $M^4$; $M^2$ is a metal being Si; v is the valency of $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof, wherein said hydrocarbyl group may be substituted or unsubstituted, may contain one or more heteroatoms, v being either 3 or 4 and w is smaller than v; and
 iii) contacting the first or second intermediate reaction product, obtained respectively in step i) or ii), with a halogen-containing Ti-compound and said internal electron donor represented by a compound of Formula A.

9. The process according to claim 7, wherein step iii further comprises contacting the first or second intermediate reaction product with an activator, selected from the group consisting of benzamides, alkylbenzoates, and mono-esters.

10. A polymerization catalyst system comprising the procatalyst according to claim 1, a co-catalyst and optionally an external electron donor.

11. A process of making a polyolefin by contacting an olefin with the catalyst system according to claim 10.

12. A method for the polymerization of an olefin, comprising:
 polymerizing the olefin using of the compound represented by Formula A,
 as an internal electron donor in a procatalyst for the polymerization of an olefin,

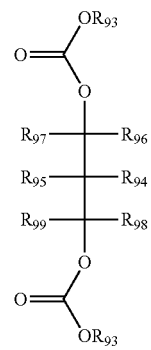

Formula A wherein: $R_{94}$, $R_{95}$, $R_{96}$, $R_{97}$, $R_{98}$, and $R_{99}$ are the same or different and are independently selected from a group consisting of hydrogen straight, branched and cyclic alkyl and aromatic substituted and unsubstituted hydrocarbyl having 1 to 20 carbon atoms;

each $R_{93}$ group is independently aryl having 6 to 20 carbon atoms.

13. The method according to claim 12, wherein each of $R_{93}$ is independently selected from the group consisting of aryl having 6 to 12 carbon atoms.

14. The method according to claim 12, wherein $R_{94}$ and $R_{95}$ is each a hydrogen atom and $R_{96}$, $R_{97}$, $R_{98}$, and $R_{99}$ are independently selected from a group consisting of $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group.

15. The method according to claim 12, wherein the internal electron donor is pentane-2,4-diyl diphenyl dicarbonate:

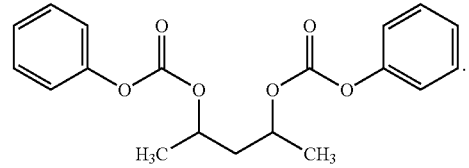 [SMILES: CC(CC(C)OC(=O)Oc1ccccc1)OC(=O)Oc1ccccc1]

16. The procatalyst according to claim 3, wherein each of $R_{93}$ is independently selected from the group consisting of aryl having 6 to 12 carbon atoms.

17. The procatalyst according to claim 6, wherein each of $R_{93}$ is independently selected from the group consisting of aryl having 6 to 12 carbon atoms.

18. The procatalyst according to claim 1, wherein the internal electron donor is pentane-2,4-diyl diphenyl dicarbonate:

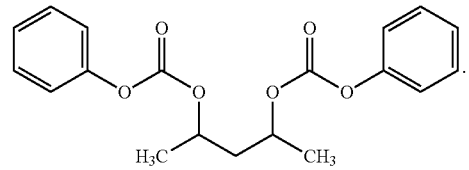 [SMILES: CC(CC(C)OC(=O)Oc1ccccc1)OC(=O)Oc1ccccc1]

19. The procatalyst according to claim 1, wherein $R_{94}$ and $R_{95}$ is each a hydrogen atom and $R_{96}$, $R_{97}$, $R_{98}$, and $R_{99}$ are independently selected from a group consisting of $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group.

20. The procatalyst according to claim 3, wherein $R_{96}$, $R_{97}$, $R_{98}$, and $R_{99}$ are independently selected from $C_1$-$C_{10}$ straight and branched alkyl groups.

21. A process for preparing the procatalyst according to claim 1, comprising contacting a magnesium-containing support with a halogen-containing titanium compound and an internal electron donor, wherein the internal electron donor is represented by a compound according to Formula A,

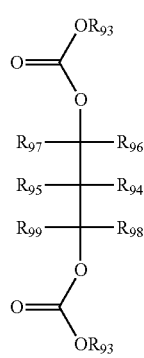

Formula A wherein $R_{94}$ and $R_{95}$ is each a hydrogen atom, and when one of $R_{96}$ and $R_{97}$ and one of $R_{98}$ and $R_{99}$ has at least one carbon atom, then the other one of $R_{96}$ and $R_{97}$ and of $R_{98}$ and $R_{99}$ is each a hydrogen atom; which process comprises the steps of:
  i) contacting a compound $R^4_z MgX^4_{2-z}$, with an alkoxy- or aryloxy-containing silane compound to give a first intermediate reaction product, being a solid $Mg(OR^1)_x X^1_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms; $X^4$ and $X^1$ are each independently selected from the group of consisting of fluoride (F—), chloride (Cl—), bromide (Br—) or iodide (I—); z is in a range of larger than 0 and smaller than 2, being $0<z<2$;
  ii) optionally contacting the solid $Mg(OR^1)_x X^1_{2-x}$ obtained in step ii) with at least one activating compound selected from the group formed by activating electron donors and metal alkoxide compounds of formula $M^1(OR^2)_{v-w}(OR^3)_w$, or $M^2(OR^2)_{v-w}(R^3)_w$, to obtain a second intermediate product; wherein: $M^1$ is a metal selected from the group consisting of Ti, Zr, Hf, Al or Si; v is the valency of $M^1$; $M^2$ is a metal being Si; v is the valency of $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof, wherein said hydrocarbyl group may be substituted or unsubstituted, may contain one or more heteroatoms, v being either 3 or 4 and w is smaller than v; and
  iii) contacting the first or second intermediate reaction product, obtained respectively in step i) or ii), with a halogen-containing Ti-compound and said internal electron donor represented by a compound of Formula A.

22. A process for preparing the procatalyst according to claim 21, wherein one of $R_{96}$ and $R_{97}$ and one of $R_{98}$ and $R_{99}$ is selected from the group consisting of $C_1$-$C_{10}$ straight and branched alkyl.

23. A process for preparing the procatalyst according to claim 1, comprising contacting a magnesium-containing support with a halogen-containing titanium compound and an internal electron donor, wherein the internal electron donor is represented by a compound according to Formula A, being diethyl pentane-2,4-diyl dicarbonate:

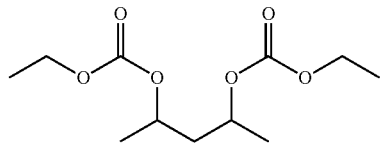 [SMILES: CCOC(=O)OC(C)CC(C)OC(=O)OCC]

which process comprises:
  i) contacting a compound $R^4_z MgX^4_{2-z}$, with an alkoxy- or aryloxy-containing silane compound to give a first intermediate reaction product, being a solid $Mg(OR^1)_x X^1_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms; $X^4$ and $X^1$ are each independently selected from the group of consisting of fluoride (F—), chloride (Cl—), bromide (Br—) or iodide (I—); z is in a range of larger than 0 and smaller than 2, being $0<z<2$;
  ii) optionally contacting the solid $Mg(OR^1)_x X^1_{2-x}$ obtained in step ii) with at least one activating compound selected from the group formed by activating electron donors and metal alkoxide compounds of formula $M^1(OR^2)_{v-w}(OR^3)_w$, or $M^2(OR^2)_{v-w}(R^3)_w$, to obtain a second intermediate product; wherein: $M^1$ is a metal selected from the group consisting of Ti, Zr, Hf, Al or Si; v is the valency of $M^1$; $M^2$ is a metal being Si; v is the valency of $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, v being either 3 or 4 and w is smaller than v; and
  iii) contacting the first or second intermediate reaction product, obtained respectively in step i) or ii), with a halogen-containing Ti-compound and said internal electron donor represented by a compound of Formula A.

* * * * *